(12) United States Patent
Hosoe et al.

(10) Patent No.: US 7,222,710 B2
(45) Date of Patent: May 29, 2007

(54) CONVEYANCE APPARATUS, CONVEYANCE SYSTEM, AND CONVEYANCE METHOD

(75) Inventors: Shigeru Hosoe, Hachioji (JP); Hiroshi Nagoya, Hachioji (JP); Nobuyuki Baba, Yamanashi (JP)

(73) Assignee: Konica Corporation, Tokyo (JP)

( * ) Notice: Subject to any disclaimer, the term of this patent is extended or adjusted under 35 U.S.C. 154(b) by 276 days.

(21) Appl. No.: 10/619,110

(22) Filed: Jul. 15, 2003

(65) Prior Publication Data

US 2004/0071513 A1   Apr. 15, 2004

(30) Foreign Application Priority Data

Jul. 18, 2002   (JP)   ............................. 2002-209658

(51) Int. Cl.
  *B65G 11/20*   (2006.01)
  *C03B 40/04*   (2006.01)
(52) U.S. Cl. .................... 193/32; 65/25.1; 65/182.2
(58) Field of Classification Search ................. 193/32; 65/25.1, 182.2
See application file for complete search history.

(56) References Cited

U.S. PATENT DOCUMENTS

| 5,226,775 | A | * | 7/1993 | Bohle | .......................... | 414/295 |
| 5,762,673 | A | * | 6/1998 | Hirota et al. | ................. | 65/25.1 |
| 6,141,991 | A | * | 11/2000 | Fujimoto et al. | .......... | 65/29.19 |
| 6,370,915 | B1 | * | 4/2002 | Fujimoto et al. | ............. | 65/25.1 |
| 6,886,815 | B2 | * | 5/2005 | Parayre et al. | ................. | 261/96 |

FOREIGN PATENT DOCUMENTS

JP           08-133758         5/1996
WO      WO 200177036 A1  * 10/2001

* cited by examiner

*Primary Examiner*—Mark A. Deuble
(74) *Attorney, Agent, or Firm*—Finnegan, Henderson, Farabow, Garrett & Dunner, L.L.P.

(57) ABSTRACT

A load conveyance device composed of:
  a load supporting device having a through hole passing in a gravity direction, and
  a fluid supplying device to supply a fluid into the through hole,
    wherein when load is dropped into the through hole from a top of the through hole, the load is supported under a floating condition by a force of the fluid in the through hole, and when the load is not supported by change of the force of the fluid, the load is dropped from a lower end of the through hole to an outside.

40 Claims, 11 Drawing Sheets

CONVEYANCE APPARATUS, CONVEYANCE SYSTEM, AND CONVEYANCE METHOD

BACKGROUND OF THE INVENTION

The present invention relates to a conveyance apparatus, conveyance system and conveyance method, which are suitable to convey a load which must be conveyed without being touched, such as a molding material.

Concerning conveyance technology for conveying a molding material such as an optical element material which is used for forming a lens, well known is one which touches and absorbs the optical element material, and conveys it to molding dies, using an absorbing pad made of Teflon or a heat-resistant rubber mounted on a conveying arm. The optical element material is heat-softened by a means such as infrared lamps arranged around the molding dies. After molding, the optical element material is absorbed by the absorbing pad and collected.

In this case, if the optical element material is heat-softened during conveyance, it is possible to shorten the molding time, however the optical element material must be conveyed under a fused condition, and accordingly, there is a problem that the above-mentioned touching and absorbing method is not suitable for conveyance of the fused optical element material. Further, concerning a method to convey the fused optical element material mounted on a conveyance member having a built-in heater, there are problems that fusion bonding between the conveyance member and the optical element material must be prevented, and still further, there is the problem of uneven heating. Concerning these problems, TOKKAIHEI 8-133758 discloses a technology by which the optical element material can be conveyed without coming into contact with the conveyance means.

According to the technology disclosed in the above mentioned TOKKAIHEI, though it is possible to hold the optical element material in a floating condition by a hot air blast which jets out from the bottom of a funnel-formed holding device, there is the problem how to throw the material into the molding dies. FIGS. 12 and 13 show the structure of the above-mentioned disclosure. The disclosed holding device holds optical element material 1 by holding sections 317a, 317b, 319a, and 319b which are hinged on pivots 318a and 318b so that holding sections 317a and 317b, and 319a and 319b are separated, whereby, optical element material 1, supported in a floating condition, drops down into the molding dies. This however requires a structure in which holding sections 317a, 317b, 319a, and 319b can pivot and are adjustable, which results in a large sized device, further the molding apparatus requires space wherein each holding section can move, resulting in a large molding apparatus. Yet further, if the rotating speeds are slightly different of the two pivoting holding sections, the optical element material is subjected to a momentary one-sided force, so that it cannot drop down vertically, by which the essential accuracy at the predetermined position is inadequate.

SUMMARY OF THE INVENTION

This invention has been achieved in view of the above-mentioned problems, and the invention makes it possible to provide a conveyance device, a conveyance system and a conveyance method of a simple structure which can convey a hot-fused load under a condition of non-contact of the interior walls (hereinafter referred to as a floating condition). The object of the invention is attained by either one of the structures described below.

Structure 1

A conveyance device, as structure 1, features a supporting means having a through hole passing vertically through from the upper section to the bottom section, and a supplying means for supplying a fluid into the through hole, when a load to be conveyed enters from the upper section of the through hole, the fluid supplied from the supplying means supports the load against gravity, and when the supporting means stops supporting, the load is allowed to flow from the bottom of the through hole, and therefore, the supporting means can convey a hot-fused optical element material by the supplied fluid, in a non-contact condition against gravity, and further, when the supporting means stops supporting, the load is allowed to flow from the bottom of the through hole, and accordingly, though this construction is simple and small, it is possible to convey the load to a narrow molding apparatus, and to bring the load into the dies easily, without requiring a large space.

After the fluid is supplied into the above-mentioned through hole for a specific time, the fluid flows to the load, the fluid pressure is not exerted directly to only a limited part of the load, as in the case of a direct air blast by a nozzle. Therefore, for the conveyance of hot-fused optical element material having a soft surface, it is possible to control the change of the form of the load during the conveyance. Accordingly, the load can be not only a solid but also a high viscosity fluid or a gelled condition.

Structure 2

Since the upper section of the above-mentioned through hole of a conveyance device of Structure 2 has a tapered wall section whose inside diameter increases toward the upper open end, the fluid supplied into the through hole flows so as to surround widely the load, and thereby the floating stability of the load becomes greater, and the load is centered in the through hole, by which the load can be protected from an unintentional contact. Further, when the load is floatingly held in the top section of the through hole, and even when the load is somewhat off-center in the through hole due to movement of the conveyance apparatus, the tapered wall section guides the load to the center of the through hole, before the load enters the dies, and by this means high accurate supplying is possible. Further, the velocity of the flowing fluid on which the load floats is reduced toward the top section of the tapered section, and thereby the floating force of the load is lower at the top section of the tapered wall section. Accordingly, the load can be stably held at the prescribed position of the tapered wall section, and even when the pressure of the fluid changes, the jounce of the position of the load is reduced, and thereby unwanted run-off or dropping of the load can be prevented. Especially, at the boundary section between the tapered wall section and the throat section (a straight wall section of a below-mentioned embodiment) of the through hole, the load works as a lid of the throat section, and thereby the fluid is ejected rapidly from the narrow clearance between the interior wall of the through hole and the load. Accordingly, even when the supplied pressure changes greatly, the function to keep the load at the prescribed position is increased. Additionally, the load is moderately rotated by the flow of the fluid, or the load pitches or vibrates within the taper surface of the tapered wall section, and therefore, the fluid touches the entire surface of the load so that the load is floated and held, in a uniform state.

Structure 3

It is preferable that the taper angle of the tapered wall section is greater than 0 degree and less than 90 degrees, as a conveyance device of structure 3. According to the researched results of the inventors of the present invention, in case that the load is floating and positioned by the fluid, when the taper angle is greater than 90 degrees, the load is apt to flow from the tapered wall section by centrifugal force working on the load, while the load rotates or vibrates within the tapered wall section. The out-flow of the load is effectively controlled by having the taper angle be acute, and further, the going-out is more effectively controlled, and the load is positioned more stably at the same position, by having the taper angle between 10–40 degrees.

Structure 4

It is preferable that the height of the above-mentioned tapered wall section is between 0.2–2.0 times that of the load, as a conveyance device of structure 4. In order to float the load stably, it is necessary to position the load between the throat section and the taper section of the through hole where the velocity of the fluid decreases suddenly, and there is no need to make the tapered wall section longer than necessary. In order to optimize downsizing of the conveyance device, while keeping the total height as short as possible, it is practically desirable to keep the height of the tapered wall section short, however too short allows the load to flow from the tapered wall section, making it impossible to position and convey the load. According to the research of the inventors, it is possible to realize a shorter and downsized conveyance device which can effectively prevent out-flow of the load by making the height of the tapered wall section between 0.2–2 times the load diameter (that is, an average diameter, when the load is nearly spherical) (more preferably, between 0.5–1.3 times the load diameter).

Structure 5

It is preferable that the top of the tapered wall section has a greater taper angle than the taper angle of the tapered wall section, and is formed on the upper open end of the tapered wall section. Because as mentioned above, in order to float the load stably, it is preferable to make a taper angle of the tapered wall section to be an acute angle, and further because in order to precisely receive the load from the top, it is preferable to form the upper open end to have a greater taper angle. It is preferable that the taper angle of the top tapered wall section is between 30–120 degrees. Besides, the height of the top tapered wall section is between 0–0.5 times the average diameter, when the shape of the load is nearly equal to the spherical shape having the same volume. Further, it is more preferable to be between 0.2–0.4 times the average diameter.

Structure 6

In the conveyance device described in structure 6, when the above-mentioned supplying means supplies the fluid to support the load from the inner circumferential plane of the through hole, it is possible to have the distribution of pressure of the fluid to be uniform, which is preferable.

Structure 7

In the conveyance device described in structure 7, when a porous material is arranged to be in at least one section of the inner circumferential plane of the through hole, it is possible to make the pressure distribution of the fluid supplied to support the load to be more uniform, which is preferable.

Structure 8

In the conveyance device described in structure 8, it is preferable that porosity ratio of the porous material is greater than 1% and less than 30% (more preferable is greater than 3% and less than 20%), making it possible for the pressure distribution of the fluid supplied for the conveyance of the load to be more uniform. According to the research by the inventors of the present invention, when the above-mentioned porous material is used, they found that the effect varies based on the porosity ratio of the porous material. The porosity ratio means the apparent porosity value wherein the total area of the pores existing on the surface of the porous material is divided by the total visual area of the surface of the porous material. It is understood that when the porosity ratio is greater than 30%, the pores are so large that the fluid is not spurted uniformly from the wall surface, and the fluid is spurted strongly here and there, so that the fluid shakes the load, which sometimes forces the load away from the through hole, and thereby the load is not floated stably in a supported condition, that is, the reliability of floating the load is then very low. Further, the spurting amount of the fluid increases so excessively that the working cost of the fluid becomes prohibitive, which is a drawback. Still further, behavior of the load changes extremely based on the flow rate and fluid pressure, therefore the flow rate and fluid pressure must be established precisely, which is very difficult in use. On the other hand, when the porosity ratio is less than 1%, the spurting amount is extremely reduced so that it is scarcely able to float the load by using, for example, an air supplied in the factory which is less than 10 atm and can be obtained easily, but makes the handling of the load difficult, which is a drawback. It is understood that the more preferable range of porosity ratio is between 3%–20%, the supplying pressure of the fluid is extremely linear to the spurting amount, and thereby, the spurting amount of the fluid can be controlled by the supply pressure of the fluid. Accordingly, in the more preferable range, there is merit in that the spurting amount is stably controlled by a pressure regulator, which is available commercially at a low price, eliminating use of an expensive flow-control meter.

Structure 9

In the conveyance device described in structure 9, the above-mentioned porous material can be a ceramic, but a graphite material is more preferable. Since graphite is a carbon, generally its heat resistance is very high, and scarcely reacts with the melted glass. If the wall surface of the through hole is made of graphite, the wall surface is not covered with the glass material, even though the melted glass comes in contact with the wall surface. Therefore, the tapered wall section is not blocked up by the load which is the melted glass. That is, reliability of heating and floating conveyance further increases. Further, since thermal conductivity of the graphite is large and approximately double that of iron, uniform temperature distribution is attained easily in the graphite, and thereby the temperature of the fluid passing through the graphite is kept uniform. That is, the fluid is supplied as a heat transfer medium to the surface of the load, and thereby, it is possible to perform uniform and precise temperature control such as heating and cooling of the load. Still further, graphite is extremely easily worked, and forming of graphite can be done at high speed by general-purpose machine tools at a low cost, differing greatly from ceramic. Still further, coefficient of linear expansion of the graphite is small and approximately one half that of iron, and size is not changed, even under high temperature, which is an advantage.

Structure 10

In the conveyance device described in structure 10, it is preferable that a movable shutter member is arranged between a shielding position, where at least a part of the through hole is shielded, and an opening position where the through hole is opened, at a downward position which is lower than the supplying section of the fluid, in the through hole. According to the research of the inventors, it is understood that by shielding a lower part of the through hole arranged in the gravitational direction, the fluid is interrupted to go away by the shutter member moved to the shielding position, and then when all fluid supplied to the through hole has flowed in the direction of the load which exists upward, the quantity of supplied fluid, which is necessary for floating the load at the same position as in the case in which the shutter member is not provided, is approximately one third that as in the case in which the shutter member is not provided. Accordingly, the supply cost of the fluid is extremely reduced by using the shutter member. Further, when the shutter member is provided, the load can be supported in a floating condition with the flow rate of the fluid being one third the case in which the shutter member is not provided, and thereby, when the shutter member is moved to the above-mentioned opening position, the force to allow the load to flow against gravity is reduced, then the load is allowed to fall (or to go down) through the through hole. That is, by a mechanical movement to open or close the shutter member, it is possible to choose whether the load floats without being touched or the load is dropped, while maintaining a constant flow rate of the fluid. Still further, when the load drops through the through hole while the shutter is opened, the fluid is always supplied, therefore the load does not contact the surface of the through hole, that is, non-contact discharge is achieved. Still further, there is no need to use a change-over mechanism of flow rate or pressure of the fluid, and only an ON/OFF movement is required for the supply of the fluid, which makes the plumbing system extremely simple. Consequently, the invention realizes high reliability, cost reduction, and ease of maintenance of the plumbing system.

Structure 11

In the conveyance device described in structure 11 wherein the supply pressure and/or the flow rate of the fluid is changeable, according to the research of the inventors, the flow rate or pressure of the supplied fluid results in the condition in which the load floats on the fluid without touching the through hole walls and the condition in which the load can be dropped. By using these conditions aggressively, without providing an open/close shutter member, it is possible to float the load or to drop the load in a predetermined position. Moreover, the scope of the condition is relatively wide so that stable operation with high repeatability is achieved. Further it is possible to provide a conveyance device with high reliability having no mechanical parts nor mechanical movement. Needless to say, it is possible to use together the change of flow rate/flow pressure of the fluid and the opening/closing of the shutter member.

Structure 12

In the conveyance device described in structure 12, when a heating member is provided to heat the fluid, supplied from the supplying member, higher than room temperature, the load can be heated by the fluid, and thereby the load remains in the hot-fused condition, which is preferable. That is, by heating the fluid, it is possible to maintain an appropriate temperature of the load which is supported by the fluid. Additionally, because of non-contact supporting, the surface of the load is heated uniformly by only the fluid. However, if heated fluid is ejected from a nozzle and applied against the load, only heated is the part of the load surface which the fluid contacts, resulting in a non-uniform temperature distribution. If a heating method is used in which a heated solid touches the load, the part touched by the heated solid is heated, also resulting in a non-uniform temperature distribution. That is, as found in conventional technology, it is possible to heat the load effectively by a method wherein the load is heated by a heated solid, and thereby the touched part is effectively heated, and non-touched parts are heated mainly by heat conducted from the touched part, and therefore, when the load is glass, having low heat conductivity, a large thermal gradient results, which is a major problem. An important point of the present invention is that heating the fluid makes it possible to heat the load uniformly through the surface, and precise thermal control of the fluid establishes a predetermined temperature for the load. As just described, since fluid is used for a heating medium in the present invention, in which heat is applied directly to the fluid, and the fluid is agitated until it arrives at the load, and the temperature of the fluid becomes uniform, and further the fluid flows in such a way that the fluid envelops the load, therefore, the surface of the load touched by the fluid is also heated uniformly, and still further, the fluid makes the load rotate arbitrarily, and makes it to oscillate/vibrate, whereby the whole surface of the load is heated uniformly, and the temperature of the load can be precisely controlled. In cases of conventional touching and heating methods, when the load is glass, the glass is softened by the heat and its viscosity is lowered, consequently it often happens that the glass flows due to its own weight so that its outer shape deforms, and further, glass adheres to the part where glass touches. Since the conveyance device of the present invention can heat the load uniformly without touching the load, using the heated fluid, the invention produces highly satisfactory results, and even when the load such as glass is softened, it is possible to continually and precisely control the temperature of the load, while maintaining its external form.

Structure 13

In the conveyance device described in structure 13, if it is possible to convey a load in a heated and fused condition by the above-mentioned conveyance device, it is preferable that the material for the optical element can be so conveyed. The surface of the heated and softened load is so softened that the load is easily deformed when a force is applied. Accordingly, when the load is heated by heated fluid ejected from a nozzle, the ejecting force of the fluid is generally so great that the load area struck by the fluid is deformed, resulting in concave deformation of the load. To overcome this problem, in the present invention, the fluid hits the lower surface of the load so that the load is supported by lowered surface-pressure, avoiding deformation. Furthermore, in a melted condition, the load is in a high thermal condition and the degree of its chemical activity is high with a lower viscosity, therefore, when the load touches a surface, the load reacts easily with the surface, and adheres to it. However, in the present invention, the load can be supported in a floating condition, without adhering to the through hole wall.

Structure 14

In the conveyance device described in structure 14, it is preferable that the load is easily supported by the supporting means, when deviation from a spherical form is less than R/2, where "R" is radius of a sphere having the same volume as the load. In the present specification, concerning the spherical form having the same volume as the load, radius R represents an average radius, and diameter 2R represents an average diameter. Since the load is supported by the fluid at a relatively low velocity in the floating condition in the conveyance device of the present invention, the conveyance device is not particular about the form of the load, but the more the load is spherical, the better the conveyance device can support the load.

Structure 15

In the conveyance device described in structure 15, it is preferable that the load is made of a glass. Usually, glass has excellent characteristics as a material for the optical elements, but it requires much time for mechanical processing such as polishing, and therefore, glass is generally first roughly formed by heating to some degree. In such a case, it is necessary to soften the glass beforehand by heating, but the final desired form is often not directly obtained, because major deformation results to the glass form. According to the present invention, it is possible to attain non-contact support of the melted load of glass without deforming the external form, and additionally, it is possible to convey and drop the load to a predetermined position, being a suitable system for conveyance of the glass. Further, concerning glass mold technology, when glass is heated and melted for press formation, in order to obtain the stability of die formation, it is necessary to keep the temperature of the glass exactly at the predetermined temperature. Employing the conveyance device of the present invention, since it is possible to control the temperature of glass, and to convey and position glass into the molding die, without contact, the die molding can be performed very precisely.

Structure 16

In the conveyance device described in structure 16, it is preferable that the load is a plastic. It is very difficult to obtain plastic optical elements without double refraction, through a molding method such as injection molding wherein resin is filled into a molding cavity with directional property through a runner or gate, and therefore, one method of solving that problem is hot press molding such as glass mold technology. Accordingly, using the conveyance device of the present invention, if it is possible to initially heat and soften a primarily spherical processing material (in which double refraction is allowable) which is obtained by injection molding, and to convey it to a press die and to position it at a predetermined location, without any deforming contact of the material and with its temperature maintained accurately, very precise molding condition is realized, and further by a press molding, having high reappearance with little double refraction, and featuring high yield, it is possible to produce precise optical elements at low cost and high yield.

Structure 17

In the conveyance device described in structure 17, it is preferable that the supporting fluid supplied from the supply means is a gas whose nitrogenous concentration is greater than 60 mol %. As a gas at a nitrogenous concentration greater than 60 mol %, there are normal air and low cost dried nitrogenous gas. Specifically, the dried nitrogenous gas negligibly oxidizes parts made of carbon or metals which are exposed to high temperature in the conveyance device, and further, as stated before, the dried nitrogenous gas can be obtained at low cost. Additionally, in the case that porous graphite is employed as the part that composes the through hole, the best effect is obtained when the dried nitrogenous gas is used for heating and floating of the load. That is, though porous graphite is a carbon, when it is heated by a fluid containing no oxygen, it can be heated to 1500° C. Therefore, even when the load is a material such as a quartz having a high fusing point, the load is heat-softened and can be supported in a floating condition, with its external form maintained, and further, the load can be conveyed and dropped to the predetermined position. In the unlikely event that the melted quartz comes into contact with the through hole wall, the melted quartz does not adhere to the through hole wall, and thereby the load continues to be supported in a floating state.

Structure 18

It is preferable that a conveyance system described in structure 18 provides the conveyance device described in any one of structures 1–17.

Structure 19

In the conveyance system described in structure 19, it is preferable that a plurality of conveyance devices are arranged in such a way that all through holes are aligned in series. For example, in case that a plurality of the above-mentioned conveyance devices are aligned vertically, the load, which is floating and supported by the fluid in an upper conveyance device, is dropped by a change of the velocity or pressure of the flowing fluid, or by the opening of a shutter member, and then, the load, which came to a lower conveyance device from the upper conveyance device, can be received in a floating condition. Due to this, the non-contact delivery of the load is achieved. These built-up conveyance devices can support a plurality of loads simultaneously so that a tact time for conveyance of the load can be reduced.

Structure 20

In the conveyance system described in structure 20, it is preferable that each conveyance device provides a heating means for raising the temperature of the load, during the time from entry into the through hole to exit from the through hole. For example, in a conveyance system wherein a plurality of conveyance devices (for example, ten sets) are provided, a series of the deliveries of the load is achieved between a plurality of conveyance devices like a bucket-brigade in such a way that the load, dropped into an uppermost conveyance device, is heated to a first temperature, while the load is floated for a predetermined time, and then the load is dropped to a lower conveyance device, where the load is further heated to a second temperature that is higher than the first temperature, and then the load is dropped to a next lower conveyance device. That is, a series of heating processes can be performed, sharing the burden over ten sets of conveyance devices, as in this case. When compared with the case where the heating process is performed by a single conveyance device, the time in the conveyance device can be shortened and the tact time in the final device is $\frac{1}{10}$, whereby the production efficiency of the series of the processes can be extremely increased. Further, as the heating means, the temperature of the fluid which is supplied to the load, can be changed so that the temperature condition of the load can be changed for each conveyance device. Therefore, operation such as heating or cooling can be performed by only delivering the load through each conveyance device under a fully non-contact condition. Accordingly, without touching a solid object, it is possible to realize various kinds of temperature processing for the load, which would result in undesired deformation or reaction by touching a solid object while heating, or for the load which is likely to result in undesired and uneven cooling by touching a solid object.

Structure 21

In the conveyance system described in structure 21, it is preferable that the plurality of conveyance devices are arranged with their through holes aligned in parallel. Instead of building up the plurality of conveyance devices vertically, by aligning them in nearly the same height, it is possible to reduce the tact time of the series of processes, and to greatly increase the production efficiency of the process. For example, there is a conveyance system composed of a total of three sets of conveyance devices, that is, at an upper stage, two devices are located in parallel horizontally to achieve the heating process, while at a lower stage, one device is located to achieve the conveyance of the load to the molding dies. In this conveyance system, two conveyance devices are structured so as to be separated horizontally with the left-to-right distance each other at an upper stage, and they move in the horizontal direction simultaneously, without changing their spacing. Firstly, in the upper stage, a first conveyance device moves and stops at a predetermined position, and receives the load, then supports it in the floating state and heats it. When half of the necessary heating time has passed, a second conveyance device in the upper stage moves to a predetermined position below the load supplying section to receive the load, and supports it for heating. That is, after the passage of half of the necessary heating time, the load supported in the first conveyance device, has been already heated to a predetermined temperature, and thereafter the load is dropped to a conveyance device at a lower stage and is conveyed to the molding dies. The empty first conveyance device moves back to the predetermined position below the load supplying position to receive a new load, and supports that load in the floating condition to heat. After that, the load supported in the floating condition in the second conveyance device is also dropped to a conveyance device at a lower stage. Thereafter, the above mentioned procedure is repeated. That is, by dividing the overall process into two sub-processes, which are the heating process under the floating condition in the conveyance device on the upper stage, and a floating conveyance process to the predetermined position in the conveyance device at a lower stage, it is possible to reduce the tact time by half. Due to this, it is possible to extremely increase the efficiency of the desired process and production efficiency. Further, any reasonable number of stages may be arranged, while only one stage is also possible. Still further, the conveyance devices which are arranged at nearly the same height, are not limited to two sets, and moreover, by providing a plurality of the stop positions, it is possible to divide the overall process into the various sub-processes to reduce the tact time.

Structure 22

In the conveyance system described in structure 22, the type of fluid ejected from the supplying section, is preferably varied. For example, when the load is conveyed under the floating condition, the conveyance device at the upper stage uses a reduction gas such as a hydrogen gas to prevent oxidization absolutely and supports the load under a floating condition, while the conveyance device at the lower stage uses inexpensive nitrogen gas to prevent oxidization softly. That is, based on the condition of the load, the conveyance devices at each stage can select optimal types of fluids and the supporting condition of the non-contact conveyance, in order to make it possible to achieve optimal conveyance of the load. More concretely, when the load is heated and melted in the conveyance device in a first stage, a highly heated hydrogen gas can be used as the supporting fluid, in order to prevent oxidization of the load and to deoxidize any already oxidized parts of the load. Further, when the load is cooled slowly in the conveyance device in a second stage, it is possible to use nitrogen gas at a somewhat cooler temperature. That is, the cost is greatly reduced by the selection of the types of fluids, based on the intended purpose. Additionally in the conveyance device in a third stage, the load can be cooled slowly by the nitrogen gas which is set at a still lower temperature, then the tact time in which the load stays at the conveyance device can be reduced, and the production efficiency is highly increased, because annealing time, which is commonly a long time, is allocated to two conveyance devices which exist at the second and third stages.

Structure 23

The conveyance method described in structure 23 is characterized in that the method is composed of a step wherein a load is dropped from the top of a through hole which is arranged from top to bottom in gravity direction, a step wherein the load is supported against gravity in a floating condition by a fluid supplied to the through hole, and a step wherein the flow condition of the fluid is changed in order to stop supporting the load, and the load drops from the lower section of the through hole. Action and effect of the present invention are the same as those of the invention described in structure 1.

Structure 24

The conveyance method described in structure 24 is characterized in that the pressure and/or flow volume of the fluid is changed in order to change the flowing condition of the fluid. Action and effect of the present invention are the same as those of the invention described in structure 11.

Structure 25

The conveyance method described in structure 25 is characterized in that at least a part of the through hole is blocked off in order to change the flowing condition of the fluid. Action and effect of the present invention are the same as those of the invention described in structure 10.

Structure 26

The conveyance method described in structure 26 is characterized in that the conveyance method has a step to heat the fluid. Action and effect of the present invention are the same as those of the invention described in structure 12.

Structure 27

The conveyance method described in structure 27 is characterized in that the load is conveyed under a heated and molten condition. Action and effect of the present invention are the same as those of the invention described in structure 13.

Structure 28

The conveyance method described in structure 28 is characterized in that the deviation from a spherical form is not greater than half of average radius R. Action and effect of the present invention are the same as those of the invention described in structure 14.

Structure 29

The conveyance method described in structure 29 is characterized in that the load is a type of glass. Action and effect of the present invention are the same as those of the invention described in structure 15.

Structure 30

The conveyance method described in structure 30 is characterized in that the load is a type of plastic. Action and effect of the present invention are the same as those of the invention described in structure 16.

Structure 31

The conveyance method described in structure 31 is characterized in that the fluid supplied to the through hole is a fluid whose nitrogen concentration is not less than 60 mol %. Action and effect of the present invention are the same as those of the invention described in structure 17.

DETAILED DESCRIPTION OF THE PREFERRED EMBODIMENT

Figure 1:
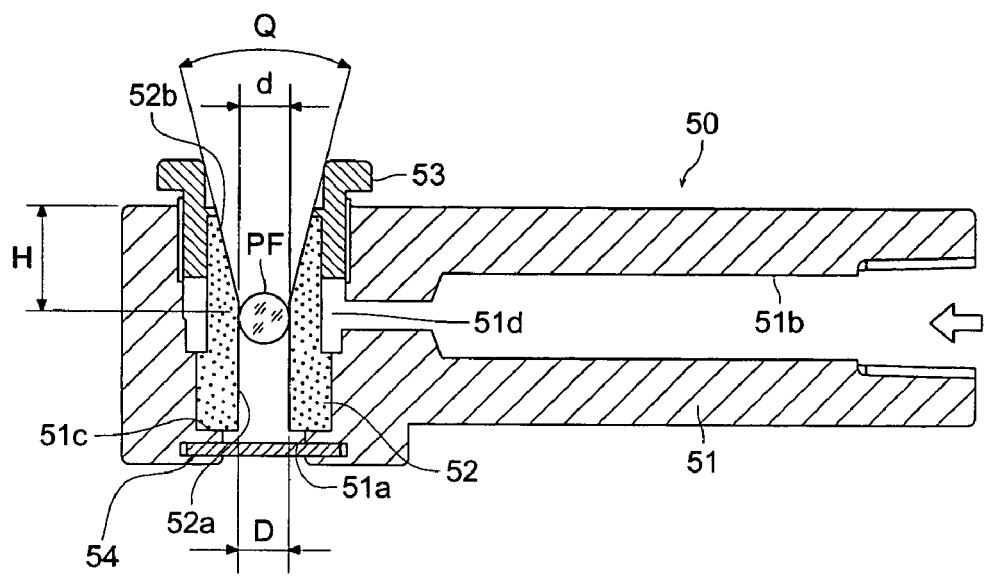
FIG. 1 is a sectional view of a conveyance device of an embodiment of the present invention.

The preferred embodiment of the present invention will be described while referring to the drawings.

FIG. 1 is a sectional view of a conveyance device of the first embodiment. In this embodiment, the load is represented by preformed glass PF as a material for an optical element, however, it is not limited to this, a plastic is also acceptable. The vertical direction is the same as the gravity direction in FIGS. 1–5, 7 and 8.

As shown in FIG. 1, conveyance device 50 is provided with conveyance arm 51 which is driven three-dimensionally by a driving device not-illustrated, supporting cylinder 52 included in through hole 51*a* which is arranged vertically in the figure at the top section (left end) of conveyance arm 51, fixing member 53 which secures supporting cylinder 52, and shutter member 54 which is arranged near the lower end of through hole 51*a*, and can be driven by an actuator not-illustrated, between a shielding position where through hole 51*a* is closed and a opening position where through hole 51*a* is not closed.

Conduit 51*b*, which exists inside conveyance arm 51, is arranged along the long axis of conveyance arm 51, and is connected to through hole 51*a*. The lower end of supporting cylinder 52 formed of porous material (in this case, graphite) comes into contact with stepped section 51*c* formed near the lower end of through hole 51*a* of conveyance arm 51, while the periphery section at the top end of supporting cylinder 52 is fitted to fixing member 53. Accordingly, fixing member 53 is screwed on through hole 51*a* from the top so that the top end and the lower end of supporting cylinder 52 are fitted to through hole 51*a* in a sealed condition. Annular space 51*d* is formed between the central periphery of supporting cylinder 52 and the inside of through hole 51*a*.

Figure 14:
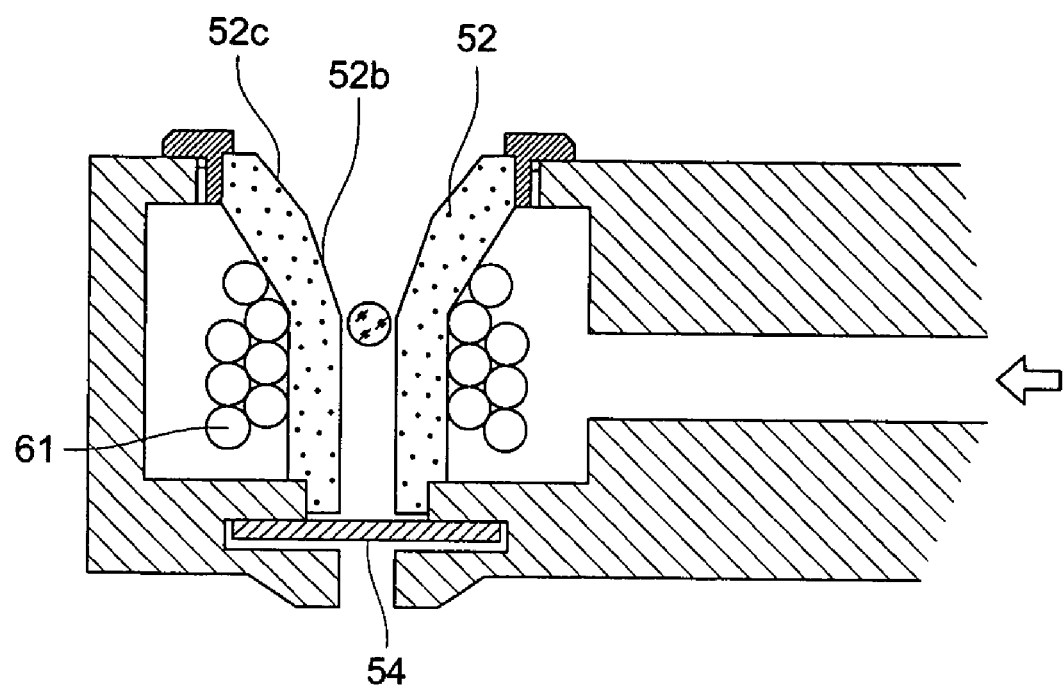
FIG. 14 shows details of the tapered wall sections of the through hole.

Straight wall section 52*a* is formed at the lower end side of the inner surface of supporting cylinder 52, and tapered wall section 52*b*, in which the diameter increases toward the top, is formed at the top end of the inner surface of supporting cylinder 52. Taper angle θ of tapered wall section 52*b* is 30 degrees in the present embodiment. When diameter d of preformed PF which is to be supported, is 7.2 mm, it is preferable that the inside diameter D of straight wall section 52*a* is 7.4 mm, and height H of tapered wall section 52*b* is (0.2–2.0) d. As shown in FIG. 14, top-most tapered wall section 52*c* whose taper angle is greater than taper angle θ of tapered wall section 52*b*, is formed at the top end of supporting cylinder 52, so that it can more easily receive preformed PF. Further the supplied gas is diffused generously so that it easily supports the load. Here, conveyance arm 51 and supporting cylinder 52 structure a load supporting means, while the porous surface of supporting cylinder 52 structures a gas supplying means. Further, straight wall section 52*a* of supporting cylinder 52 and tapered wall section 52*b* structure the through hole which passes through in gravity direction.

Figure 2:
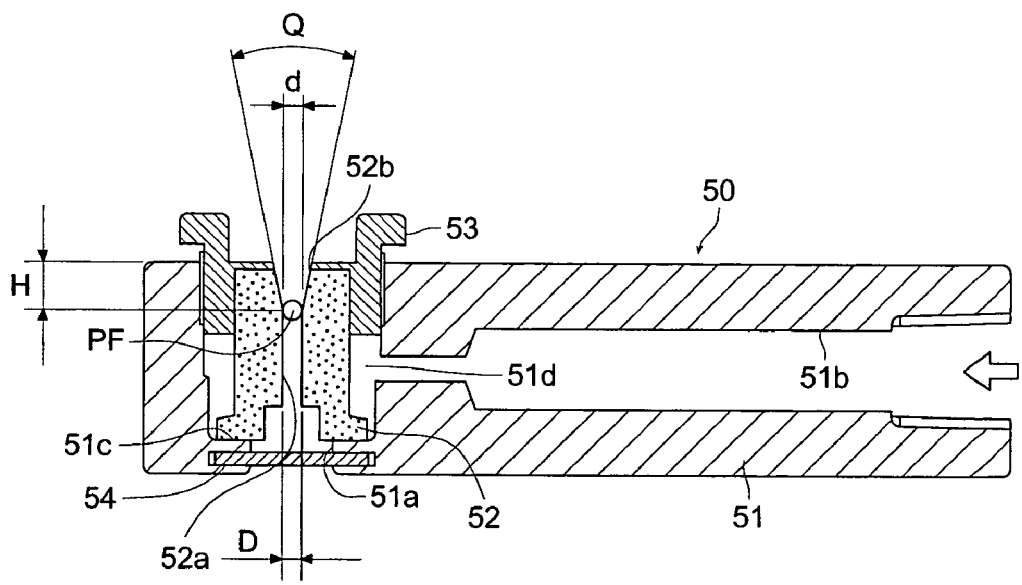
FIG. 2 is a sectional view of a variation of a conveyance device of an embodiment of the present invention.

FIG. 2 shows a variation of the conveyance device of the present embodiment, however only the sizes of each section are different from those shown in FIG. 1, therefore, the same symbols and numbers as those of the embodiment shown in FIG. 1 are used, and the associated explanation is not repeated. In the present variation, taper angle θ of tapered wall section 52*b* is also 30 degrees, When diameter d of preformed PF which is to be supported, is 2.6 mm, it is preferable that inside diameter D of straight wall section 52*a* is 2.8 mm, and height H of tapered wall section 52*b* is (0.2–2.0) d.

Figure 3:
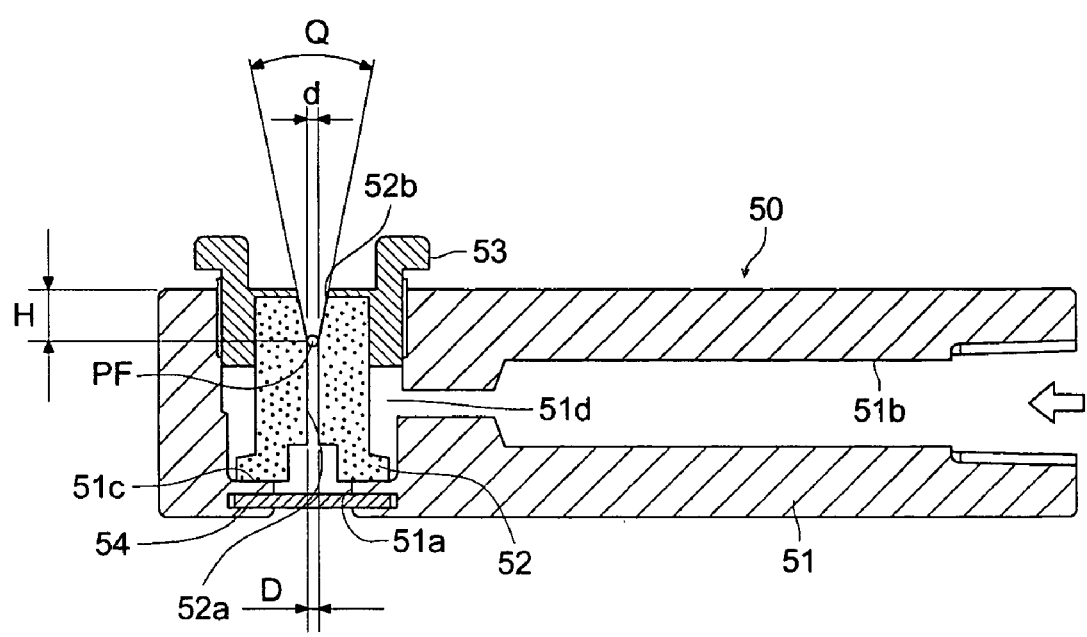
FIG. 3 is a sectional view of another variation of a conveyance device of an embodiment of the present invention.

FIG. 3 shows another variation of the conveyance device of the present embodiment, only the sizes of each section are different from those shown in FIG. 1, therefore, the same symbol and numbers as those of the embodiment shown in FIG. 1 are used, and the associated explanation is not repeated. In the present variation, taper angle θ of tapered wall section 52*b* is 30 degrees. When diameter d of preformed PF which is to be supported, is 1.2 mm, it is preferable that inside diameter D of straight wall section 52*a* is 1.4 mm, and height H of tapered wall section 52*b* is (0.2–2.0) d.

Figure 4:
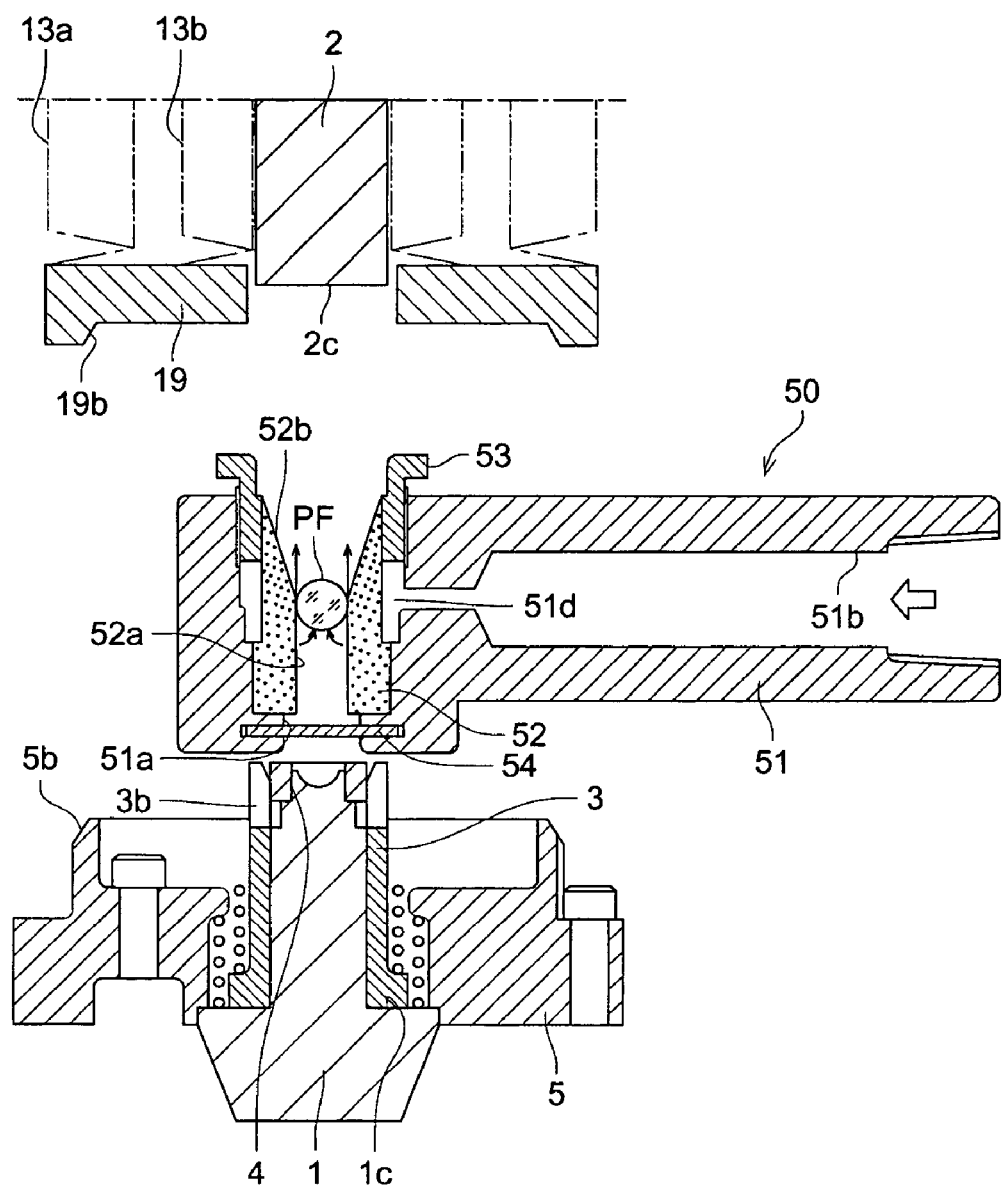
FIG. 4 is an enlarged sectional view showing a material, molding dies and adjacent parts, and a conveyance device.

Next, the operation of conveyance device 50 will be described. FIG. 4 is an enlarged section showing the molding dies for the material, the circumference of the press forming device and the conveyance device. When conveyance device 50, which receives preformed PF in supporting cylinder 52 at the preformed load supplying position not illustrated, has shutter member 54 which is in the closed position, and features heated and dried nitrogen gas (the nitrogen concentration is to be greater than 60 mol %) pressurized from the outside by high pressure into conduit 51*b*, and thereby, the heated and dried nitrogen gas is forced evenly from the entire inner circumferential surface of supporting cylinder 52 which is a porous material through annular space 51*d* so that preformed PF can be floated and supported under a non-contact condition (being a step of supporting the load). In this case, tapered wall section 52*b* exists at the inner top section of supporting cylinder 52, so that preformed PF can be supported stably at the border between straight wall section 52*a* and tapered wall section 52*b*, where the pressure changes suddenly.

In this case, when the dried nitrogen gas is heated by a heater not illustrated, it is possible to heat the outer surface of preformed PF adequately during the conveyance (being a step to heat the load), and further, preformed PF is rotated and vibrated by the dried nitrogen gas so that all surface of preformed PF are heated evenly.

Next, while supporting preformed PF in a floating condition, conveyance arm 51 is moved, so that supporting cylinder 52 is positioned between lower die 1 and upper die 2 of the molding device, whose total shape is not illustrated. After that, shutter member 54 is opened by an actuator not illustrated, the pressure of the dried nitrogen gas for supporting preformed PF reduces and can no longer support preformed PF, then preformed PF drops and passes through straight wall section 52a of supporting cylinder 52, thereafter, goes away from the lower end of through hole 51a of conveyance device 50 (being a step for breaking away the load). In this case, since supporting cylinder 52 is formed of porous graphite which is hardly adhered to the molten glass, preformed PF is dropped onto lower molding die 1, without adhering to supporting cylinder 52.

After conveyance arm is turned out, the forming operation starts, and lower molding die 1 goes up near upper molding die 2. Further, the nitrogen gas (or air) is pressurized between metal bellows 13a and 13b, which are covering members, from the outside to extend metal bellows 13a and 13b. Tapered surface 19b of touching member 19 moves with the lower end of expanded metal bellows 13a and 13b, and touches tapered surface 5b of fixing member 5, resulting in close contact of tapered surface 5b of fixing member 5 with tapered surface 19b. By this operation, the space surrounding the molding position where preformed PF is placed, is shielded from the circumferential atmosphere. Under the above condition, any remaining nitrogen gas is released from the shielded space by a pump representing a vacuuming means, then the degree of vacuum of the space surrounding the molding dies is reduced to a level of less than 1 KPa. It is preferable that a scroll type vacuum pump is used, because it does not rely on use of an oil, resulting a minimal maintenance and low noise characteristics, which is better for the environment. The time necessary for reducing the pressure is approximately one second.

Further, since preformed PF represents a material to be formed, is heated and melted beforehand to the required temperature for pressing, as soon as vacuum drawing starts after the dies are covered and sealed, it is possible to allow lower die 1 to move up to start molding. Cylindrical frame 3 is fitted around lower die 1, and when lower die 1 moves up, the top end of frame 3 contacts with standard surface 2c of upper die 2, and the degree of parallelism of standard surfaces 2c and 1c of molding dies 2 and 1 is achieved. After this condition has passed for a few seconds, the nitrogen gas is supplied to the space which is under the reduced pressure around dies 2 and 1, while heater temperature in the dies is controlled so that molding dies 2 and 1 are slowly cooled to the level less than the transition temperature of glass.

Then the nitrogen gas is exhausted by a pressure control structure not illustrated, from double structured metal bellows 13a and 13b, and metal bellows 13a and 13b contract to force touching member 19 to separate from fixing member 5. By the above procedure, preformed PF is formed as an optical element.

Figure 5:
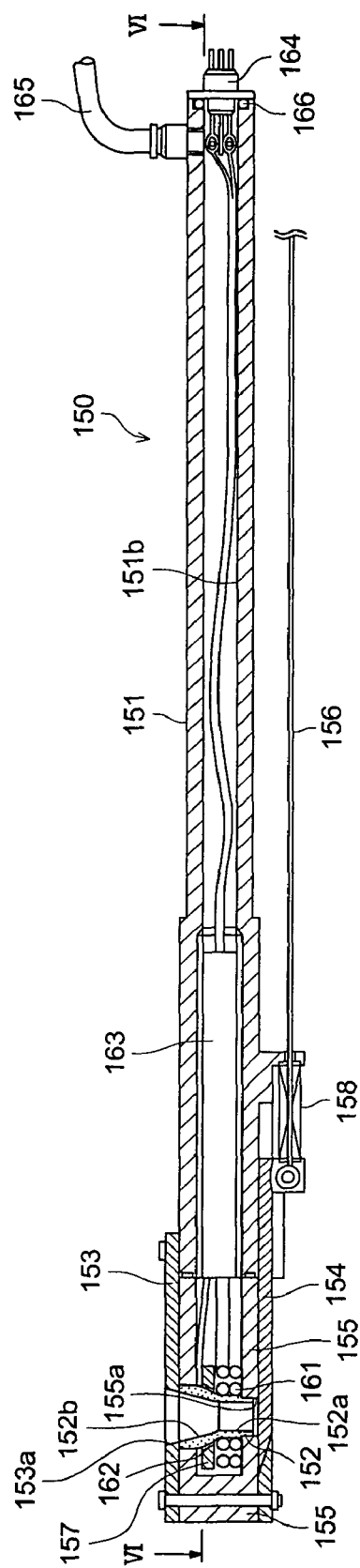
FIG. 5 is a sectional view of a conveyance device of a second embodiment of the present invention.
Figure 6:
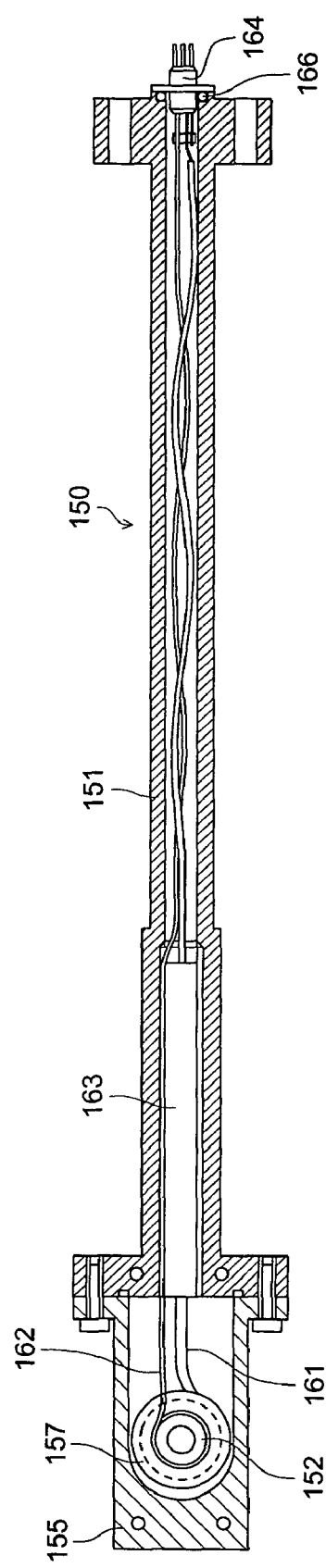
FIG. 6 is a sectional view taken on line VI—VI of the conveyance device shown in FIG. 5.

FIG. 5 is a sectional view of the conveyance device of the present embodiment. FIG. 6 is a sectional view taken on line VI—VI of the conveyance device shown in FIG. 5. In FIGS. 5 and 6, conveyance device 150 is provided with;

long and narrow conveyance arm 151 which is driven three-dimensionally by an un-illustrated driving device, heat-resistant ceramic holder 155, which is arranged at the top end (left end) of conveyance arm 151, supporting cylinder 152 fitted to through hole 155a which is arranged vertically in the figure of holder 155, shutter member 154 which moves between a shielding position (see FIG. 5) which is arranged near the lower end of through hole 155a and is connected to an un-illustrated actuator by wire 156, in order to close through hole 155a, and a releasing position to open through hole 155a, and ceramic spring 158 made by zirconia to urge shutter member 154 to the shielding position for stabilizing partially. In the present embodiment, a supporting means is composed of conveyance arm 151, holder 155, and supporting cylinder 152.

On the inner circumferential surface of supporting cylinder 152 formed by a porous material (graphite is used in this embodiment), there are straight wall section 152a having the same diameter which is formed at the lower end of the inner surface of supporting cylinder 152, and tapered wall section 152b in which the diameter increases toward the upper end, which is formed at the upper top end of the inner surface of supporting cylinder 152. Sheathed heater 161 used as a heating means, is arranged on the internal center of holder 155 in such a way that they surround straight wall section 152a of supporting cylinder 152, in addition thermostat 162 and heat insulating plate 157 are arranged on the peripheral surface of tapered wall section 152b. Further, heater 163 as a heating means is arranged in conduit 151b. Sheathed heater 161, thermostat 162, and heater 163 are connected to electrode 164 attached at the end of conduit 151b, and can be activated electrically from the outside through a not-illustrated connector which is connected to electrode 164.

In the present embodiment, dried nitrogen gas of 0.2 MPa, which is supplied in conduit 151b through pipe 165 connected to the end of conduit 151b, is heated by heater 163, and is further heated along the path through the porous material of supporting cylinder 152 which is heated by sheathed heater 161, and can also heat preformed PF not-illustrated. The temperature of supporting cylinder 152 can be detected by thermostat 162, and thereby, the feedback control of the sheathed heater can be achieved.

Since tapered end section 153a which extends at the same taper angle (or a greater taper angle) from tapered wall section 152b, is formed on presser plate 153 in this embodiment, tapered end section 153a as well as tapered wall section 153 can further control scattering of the preformed PF. Further, since presser plate 153 is formed of high density graphite, even though the preformed PF comes into contact with presser plate 153, it is possible to prevent them from adhering to each other. In the present embodiment, the taper angle is 30 degrees, the maximum diameter of the preformed PF which can be supported, is 7.2 mm, and the inside diameter of straight wall section 152a is 7.5 mm.

The change-over operation of the supporting and dropping of the performed PF is performed by the closing/opening movement of shutter member 154. Shutter member 154 is activated into the closed position, as shown in FIG. 5, by ceramic spring 158 made by zirconia that can sustain its elasticity at high temperatures, and when wire 156 is pulled to the right side in the figure, shutter member 154 can be moved to the open position against the force of spring 158, and thereby, the floating preformed PF can be dropped.

In the present embodiment, nitrogen gas is supplied under a pressure of 0.2 MPa, which is lower than the stable driving area of the after-mentioned experimental results. This is due to the fact that the thickness of the porous material is set at half of the experimental result, and the part is formed so that the fluid can flow under lowered supplying pressure, and therefore, floating support of the load can be achieved at the stable area with margins. Concerning the material of conveyance arm 151, since it is preferable to use one having high heat resistance and nearly the same coefficient of linear expansion as the ceramic material used for holder 155, nobinite cast iron is used. The wirings of sheathed heater 161, heater 163 and thermostat 162 are drawn from the end of conveyance arm 151 to the outside through hermetically sealed electrode 164 for gas-tightness. A connected section between electrode 164 and conveyance arm 151 is sealed by heat-resistance C-ring or heat-resistance O-ring 166 to prevent the supplied nitrogen gas from leaking.

In the same way as for the embodiment mentioned above, in conveyance device 150 of the present embodiment, the nitrogen gas is supplied from fluid supplying pipe 165 through the end section of conveyance arm 151, and is heated by sheathed heater 161, and further ejected from the inside surface of porous supporting cylinder 152, and finally the nitrogen gas supports preformed PF (not illustrated) without being touched in a floating condition. In the above-mentioned procedure, preformed PF rotates or moves in parallel in a floating condition so that the surface of the preformed PF is heated uniformly. Conveyance device 150 conveys preformed PF to the desired predetermined position, and drops it so that the consistent position delivery is performed.

Control of the heating temperature of the nitrogen gas is performed in such a way that the temperature of the nitrogen gas is detected by thermostat 162 and electrical current passing through sheathed heater 161 is controlled by a control circuit not illustrated. In order to prevent thermostat 162 from being directly heated by sheathed heater 161 which is coiled around porous supporting cylinder 152, heat insulating plate 157 is arranged between supporting cylinder 152 and sheathed heater 161.

Concerning the non-contact heating floating support of the load by conveyance device 150 shown in FIGS. 5 and 6, the inventor performed experiments in such conditions that the load was an optical glass of L-BAL42 with a transition point of 506° C. made by Ohara Co., the temperature was set to 550° C., and shutter member 154 was closed. The optical glass rotated under the floating condition due to the flow of nitrogen gas, and its surface was uniformly supported by the heated nitrogen gas, and when 30 seconds had passed after dropping, the optical glass was melted and softened. Further when the temperature was set to 600° C., the optical glass was completely melted, and deformed when it was touched by tweezers, having kept its spherical shape in the floating condition. In this condition, when shutter member 154 was opened to drop the melted optical glass, the optical glass did not come into contact with the inner surface of the porous graphite in supporting cylinder 152, and dropped vertically.

Figure 7:
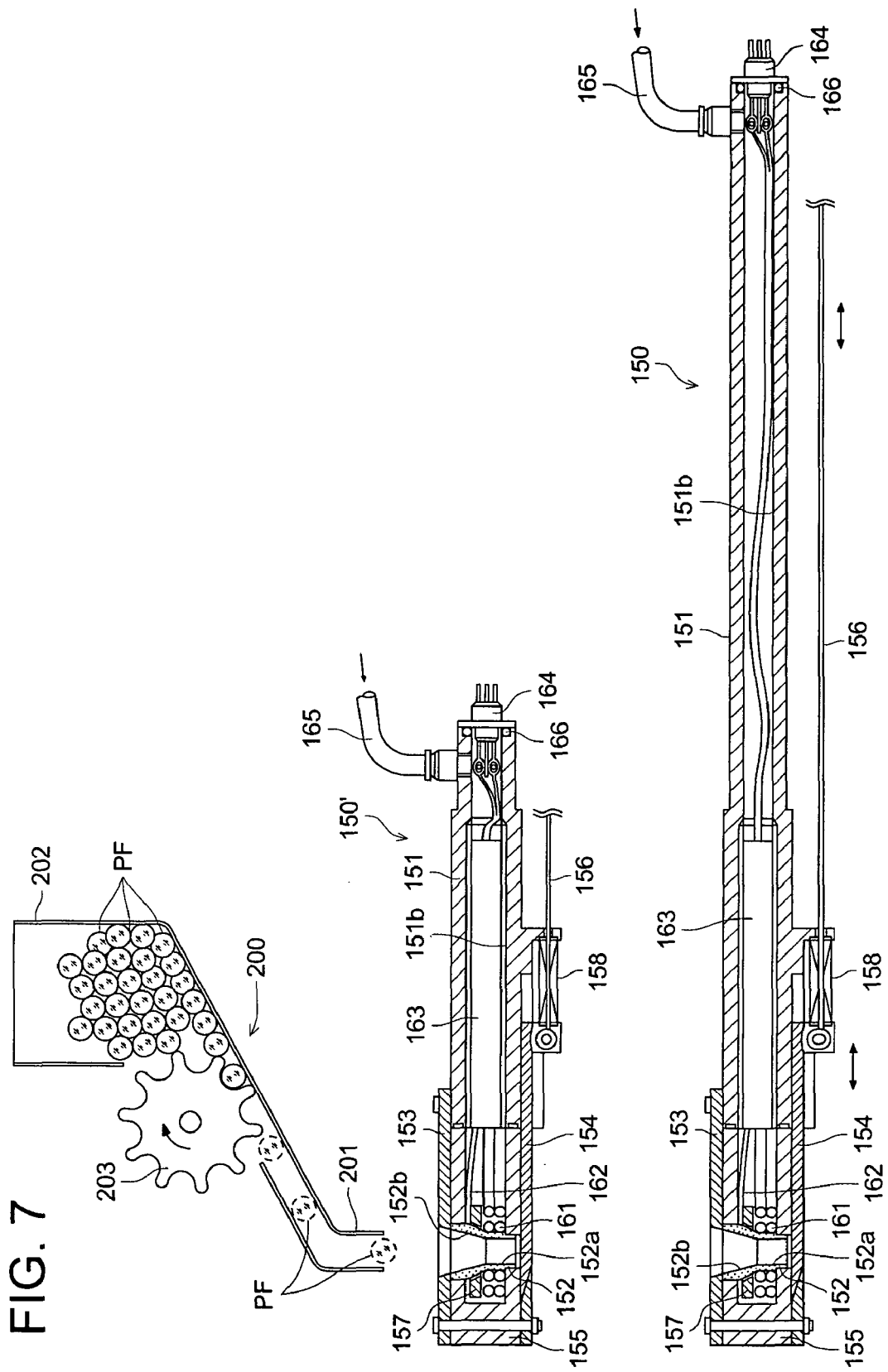
FIG. 7 is a sectional view of a conveyance system of an embodiment of the present invention.

FIG. 7 is a sectional view showing the conveyance system of the present embodiment. The conveyance system is composed of conveyance devices which are arranged on two stages vertically. Since the lower conveyance device has the same structure as the structure of conveyance device 150 shown in FIGS. 5 and 6, the same symbols and numbers refer to the same members, and the explanations are omitted. Since the upper conveyance device has the conveyance arm which is only one third that of conveyance device 150 shown in FIGS. 5 and 6, only the numerical numbers of the conveyance device are put dashes to distinguish, and another members which are the same as those shown in FIGS. 5 and 6, are put the same numerical numbers and the explanations are omitted. In the condition of FIG. 7, conveyance devices 150 and 150' align their supporting cylinders 152 one above the other.

Upper conveyance device 150' is fixed so that supporting cylinder 152 is arranged under supplying outlet 201 of preformed glass ball supplying section 200, while movable lower conveyance device 150 is arranged so that supplying cylinder 152 becomes aligned with the center line of the supplying cylinder of upper conveyance device 150' as shown in FIG. 7. Preformed glass ball supplying section 200 is composed of stocker 202 for storing a large number of preformed glass balls PF, and rotatable sprocket 203 which feeds glass balls one by one to supplying outlet 201.

The preformed glass balls (at an average diameter of 3 mm) which are conveyed by the present conveyance system is nearly spherical optical glass M-LaC 130 made by Hoya Glass Co., at a maximum diameter of 3.2 mm. Supplying cylinders 152 of both conveyance devices are formed of graphite having an porosity ratio of 16%, the inside diameter of straight wall section 152*a* being 3.4 mm, the taper angle of tapered wall section 152*b* being 30 degrees, and its height being set to 3 mm which is equal to the average diameter of the preformed glass balls. Further, the supplied fluid is nitrogen gas at a pressure of 0.2 MPa.

According to the experimental results supplied by the inventor, the targeted setting temperature of upper conveyance device 150' was set to 540° C., while that of lower conveyance device 150 was set to 580° C. After shutter members 154 of both conveyance devices 150' and 150 were closed, sprocket 203 of glass ball PF supplying section 200 was rotated, then a single glass ball PF in a normal temperature was dropped into supporting cylinder 152 of upper conveyance device 150', and glass ball PF was supported for 30 seconds in the heated and floating condition. Immediately after that, shutter member 154 was opened to allow glass ball PF to drop, and glass ball PF was received in supporting cylinder 152 of lower conveyance device 150 which was arranged just under supporting cylinder 152 of upper conveyance device 150', and further, glass ball PF continued to be supported in the heated and floating condition.

Then shutter member 154 of upper conveyance device 150' was closed immediately, sprocket 203 of glass ball supplying section 200 was rotated to drop a single glass ball PF in a normal temperature into supporting cylinder 152, and glass ball PF was supported in the heated and floating condition. When 20 seconds had passed after glass ball PF was delivered to the lower conveyance device, lower conveyance device 150 was moved so that the center of supporting cylinder 152 was aligned with the center of the press molding die which was set to a predetermined temperature. Next shutter member 154 was opened to drop molten and softened glass ball PF, so that glass ball PF was placed to the predetermined position, immediately after that, shutter member 154 was closed, and lower conveyance device 150 returned to its former position under upper conveyance device 150'. As soon as conveyance device 150 returned, the press molding die (not illustrated) began the pressing operation, molded glass ball PF and then performed the annealing process. Before next glass ball PF was dropped, the molding die opened to exhaust the previous molded optical element, and the molding die entered a standby condition with its die open. As shown in FIG. 7, when lower conveyance device 150 returned, it was set for 30 seconds to pass since glass ball PH was dropped into upper conveyance device 150', and due to this, glass ball PF was heated for 30 seconds in upper conveyance device 150', glass ball PF was dropped as soon as lower conveyance device 150 was directly under upper conveyance device 150', and finally, glass ball PF was received by lower conveyance device 150. By performing the above-mentioned operations continuously, after glass ball PF was heated and softened uniformly for 30 seconds at 540° C. in upper conveyance device 150', it was heated for 30 seconds at 580° C. in lower conveyance device 150 and it became molten, and thereby, glass balls PF could be fed into the molding die repeatedly. Accordingly, though the heating process was performed for one minute, it was possible to perform the molding in a tact time of 30 seconds.

In the present embodiment, the switching from the floating support to the dropping of preformed PF is performed by the opening/closing operation of the shutter member, however, it is also possible to perform the switching by changing the supplied gas pressure, instead of providing the shutter member for another embodiment.

Figure 8:
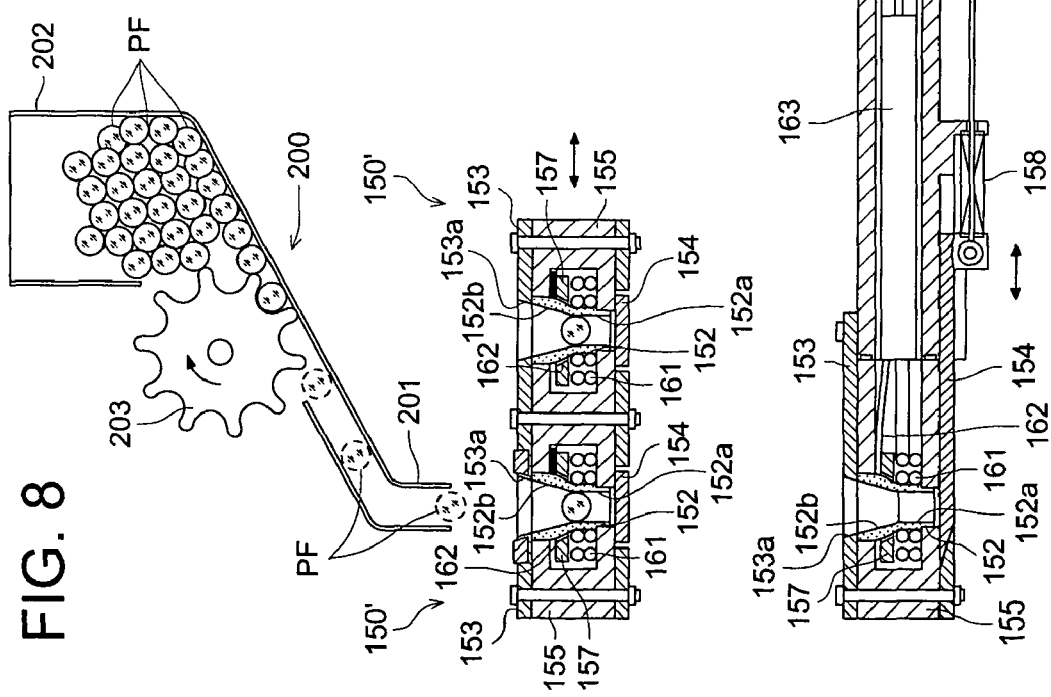
FIG. 8 is a sectional view of a conveyance device of a second embodiment of the present invention.
Figure 8:
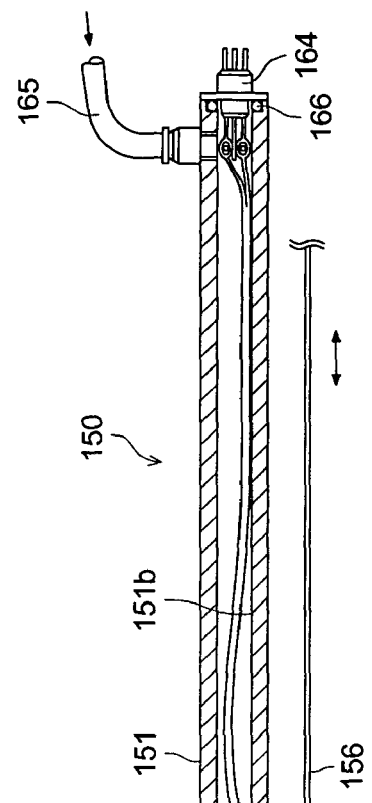

FIG. 8 is a sectional view of the conveyance system of the second embodiment. This conveyance system is composed of conveyance devices which are aligned in two stages vertically, the same way as the system shown in FIG. 7. However, two sets of conveyance devices are arranged on the upper stage, and can be moved horizontally under supplying outlet 201 of glass ball supplying section 200. Since the lower conveyance device is structured in the same manner as conveyance device 150 shown in FIG. 5, 6, or 7, the same numerals are used for the same members, and the respective explanations are omitted. On the other hand, since two identical conveyance devices are arranged in parallel only in the upper stage, the same numerals are used for the same members, and the respective explanations are omitted. In the condition shown in FIG. 8, both of conveyance devices 150' of the upper stage are arranged so that their supporting cylinders 152 are arranged adjacent to each other.

The glass balls (at an average diameter of 3 mm) which are conveyed by the present conveyance system are nearly spherical optical glass M-LaC 130 made by Hoya Glass Co., and have a maximum diameter of 3.2 mm. Supplying cylinders 152 of both conveyance devices are formed by the graphite having an porosity ratio of 16%, the inside diameter of straight wall section 152a being 3.4 mm, the taper angle of tapered wall section 152b being 30 degrees, and its height being set to 3 mm which is equal to the average diameter of preformed PF. Further, the supplied fluid is nitrogen gas fed at a pressure of 0.2 MPa.

According to the experimental results submitted by the inventor, the targeted temperature of upper conveyance devices 150' was set at 540° C., while that of lower conveyance device 150 was set at 580° C. In the condition shown in FIG. 8, there are three sets of conveyance devices, and after shutter members 154, of respective conveyance devices 150', and 150 were closed, sprocket 203 of glass ball supplying section 200 was rotated, then a single glass ball PF in a normal temperature was dropped into supporting cylinder 152 of left conveyance device 150' of the upper stage. Next, left and right upper conveyance devices 150' were moved in a single unit to left in the figure, when 15 seconds had passed after glass ball PF was dropped into upper conveyance device 150', sprocket 203 of glass ball supplying section 200 was rotated, so that a single glass ball Pf in normal temperature was dropped into supporting cylinder 152 of the right upper conveyance device 150'.

After that, both conveyance devices 150' were integrally moved toward the right in the figure, resulting the condition shown in FIG. 8. When 30 seconds had passed after glass ball PF were dropped in left conveyance device 150' on the upper stage, shutter member 154 were moved to the open position to drop glass ball PF, and glass ball PF was received by supporting cylinder 152 of conveyance device 150 of the lower stage which was previously positioned just under supporting cylinder 152 of right conveyance device 150 of the upper stage, and further, additional glass balls PF were repeatedly supported in the heated and floating condition.

Shutter member 154 of left conveyance device 150' of the upper stage was then immediately closed, sprocket 203 of glass ball supplying section 200 was rotated to drop a single glass ball PF in a normal temperature into supporting cylinder 152, and glass ball PF was supported in the heated and floating condition. Conveyance device 150 of the lower stage which had received glass ball PF, was moved onto the center of the press molding die, which was previously maintained at a set temperature, so that the center of supporting cylinder 152 was positioned at the center of the molding press. Then shutter member 154 was opened to drop melted and softened glass ball PF, and glass ball PF were fell into the predetermined position, next shutter member 154 was immediately closed, and finally, conveyance device 150 of the lower stage returned just under right conveyance device 150 of the upper stage, as shown in FIG. 8.

As soon as conveyance device 150 returned, the molding press die (not illustrated) began its pressing operation and molded glass ball PF, and then performed the annealing process. Before next glass ball PF was dropped, the molding die opened to expel the newly formed molded optical element, and the molding die entered the stand-by condition with its die open.

As shown in FIG. 8, the apparatus was designed that when conveyance device 150 of the lower stage returned, 30 seconds had passed since glass ball PH was dropped into right conveyance device 150' of the upper stage, and due to this, glass ball PF was heated for 30 seconds in conveyance device 150' of the upper stage, glass ball PF was dropped as soon as conveyance device 150 of the lower stage was positioned directly under conveyance device 150' of the upper stage, and finally, glass ball PF was received by conveyance device 150 of the lower stage. By performing the above-mentioned operations continuously, while the system performed the heating of glass ball PF for 30 seconds at 540° C., it was possible to supply glass balls PF at an interval of 15 seconds. Accordingly, it is possible to make the tact time of press molding to 15 seconds.

In a series of the operation mentioned above, in which the dropping position of the glass ball PF at room temperature from supplying outlet 201, and the glass ball PF receiving position of the conveyance device of the lower stage, are decided by the relative positional relationship to conveyance device 150' of the upper stage. Accordingly, instead of the above-mentioned embodiment, it is also possible to structure a system in which the conveyance device of the upper stage is fixed, and the supplying outlet of the glass ball at room temperature and the conveyance device 150 of the lower stage are moved, and further, the glass ball is transferred under both supporting cylinders 152 of conveyance devices 150' of the upper stage. Further, when a plurality of stages of the conveyance device are provided, different types of fluids may be used for each conveyance device.

EXAMPLE

The following description details experimental results of this invention by the inventors. As shown in FIG. 1, the nearly spherical load was floated and conveyed by the supporting cylinder (having a tapered wall section of 30 degrees) formed of a porous material. The maximum diameter of the load was 7.2 mm, which the inside diameter of the straight wall section was 7.5 mm. The floating condition of the load was observed by the inventors under the condition that three types of supporting cylinders were used, made of porous materials with porosity ratios of 21%, 16%, and 8%, and the supplied air pressure was varied. Further, the inventors observed the floating condition of the load when the shutter member located at the bottom end of the supporting cylinder, were closed and opened. The results are shown in Table 1, 2, and 3. The porosity ratio means a value wherein the total area of the pores on the surface of the porous material is divided by the total area of the surface of the porous material. The greater the porosity ratio is, the more fluids can pass through the porous material.

TABLE 1

Porosity ratio: 21%
Diameter of load: 7.2 mm

| Pressure of supplied gas [MPa] | 1st CLOSE | 1st OPEN | 2nd CLOSE | 2nd OPEN | 3rd CLOSE | 3rd OPEN | 4th CLOSE | 4th OPEN | 5th CLOSE | 5th OPEN | 6th CLOSE | 6th OPEN | Reference |
|---|---|---|---|---|---|---|---|---|---|---|---|---|---|
| 0 | — | — | — | — | — | — | — | — | — | — | — | — | |
| 0.02 | A | ↓ | A | ↓ | A | ↓ | | | | | | | Rotating |
| 0.04 | A | ↓ | A | ↓ | A | ↓ | | | | | | | Jiggling |
| 0.06 | A | ↓ | A | ↓ | A | ↓ | | | | | | | Jiggling |
| 0.08 | A | ↓ | A | ↓ | A | ↓ | | | | | | | Jiggling |
| 0.10 | A | ↓ | A | ↓ | A | ↓ | | | | | | | Jiggling violently |
| 0.12 | A | ↓ | A | ↓ | A | ↓ | | | | | | | Jiggling violently |
| 0.14 | A | A | A | A | A | A | | | | | | | Jiggling violently |
| 0.16 | A | A | A | A | A | A | | | | | | | Jiggling violently |

Experimental condition: The load was dropped from a position 30 mm above the mouth of the supporting cylinder, while the shutter was closed.
Symbol A: The load was caught by the arm side graphite, and was floated while rotating.
Symbol ↑: The load flew out over the arm.
Symbol ↓: The load dropped immediately to the bottom, or the load dropped when the shutter was opened.
Measuring instrument: a regulator gauge at minimum scale value of 0.02 MPa.
Supplied air: factory air in normal temperature.

TABLE 2

Porosity ratio: 16%
Diameter of load: 7.2 mm

| Pressure of supplied gas [MPa] | 1st CLOSE | 1st OPEN | 2nd CLOSE | 2nd OPEN | 3rd CLOSE | 3rd OPEN | 4th CLOSE | 4th OPEN | 5th CLOSE | 5th OPEN | 6th CLOSE | 6th OPEN | Reference |
|---|---|---|---|---|---|---|---|---|---|---|---|---|---|
| 0 | — | — | — | — | — | — | — | — | — | — | — | — | |
| 0.26 | ↓ | — | ↓ | — | ↓ | — | ↓ | — | ↓ | — | ↓ | — | Not caught |
| 0.28 | ↓ | — | ↓ | — | ↓ | — | ↓ | — | ↓ | — | ↓ | — | Not caught |
| 0.30 | ↓ | — | ↓ | — | A | ↓ | A | ↓ | A | ↓ | A | ↓ | Rotating |
| 0.32 | A | ↓ | ↓ | — | ↓ | — | A | ↓ | A | ↓ | A | ↓ | Rotating |
| 0.34 | A | ↓ | A | ↓ | A | ↓ | A | ↓ | A | ↓ | A | ↓ | Rotating |
| 0.36 | A | ↓ | A | ↓ | A | ↓ | A | ↓ | A | ↓ | A | ↓ | Rotating |
| 0.38 | A | ↓ | A | ↓ | A | ↓ | A | ↓ | ↓ | — | A | ↓ | Rotating |
| 0.40 | A | ↓ | A | ↓ | A | ↓ | A | ↓ | A | ↓ | A | ↓ | Rotating |
| 0.42 | A | ↓ | A | ↓ | A | ↓ | A | ↓ | A | ↓ | A | ↓ | Rotating |
| 0.44 | A | ↓ | A | ↓ | A | ↓ | A | ↓ | A | ↓ | A | ↓ | Rotating |
| 0.46 | A | ↓ | A | ↓ | A | ↓ | A | ↓ | A | ↓ | A | ↓ | Rotating |
| 0.48 | A | ↓ | A | ↓ | A | ↓ | A | ↓ | A | ↓ | A | ↓ | Rotating |
| 0.50 | A | ↓ | A | ↓ | A | ↓ | A | ↓ | A | ↓ | A | ↓ | Rotating |

Experimental condition: The load was dropped from a position 30 mm above the mouth of the supporting cylinder, while the shutter was closed.
Symbol A: The load was caught by the arm side graphite, and was floated while rotating.
Symbol ↑: The load flew out over the arm.
Symbol ↓: The load dropped immediately to the bottom, or the load dropped when the shutter was opened.
Measuring instrument: a regulator gauge at minimum scale value of 0.02 MPa.
Supplied air: factory air in normal temperature.

TABLE 3

Porosity ratio: 8%
Diameter of load: 7.2 mm

| Pressure of supplied gas [MPa] | 1st CLOSE | 1st OPEN | 2nd CLOSE | 2nd OPEN | 3rd CLOSE | 3rd OPEN | 4th CLOSE | 4th OPEN | 5th CLOSE | 5th OPEN | 6th CLOSE | 6th OPEN | Reference |
|---|---|---|---|---|---|---|---|---|---|---|---|---|---|
| 0 | — | — | — | — | — | — | — | — | — | — | — | — | |
| 0.30 | ↓ | — | ↓ | — | ↓ | — | ↓ | — | ↓ | — | ↓ | — | Dropping slowly |
| 0.32 | ↓ | — | ↓ | — | ↓ | — | ↓ | — | ↓ | — | ↓ | — | Dropping slowly |
| 0.34 | A | ↓ | A | ↓ | A | ↓ | ↓ | — | A | ↓ | A | ↓ | Rotating |
| 0.36 | A | ↓ | ↓ | — | ↓ | — | A | ↓ | A | ↓ | A | ↓ | Rotating |

TABLE 3-continued

| Porosity ratio: 8% | Shutter member | | | | | | | | | | | |
|---|---|---|---|---|---|---|---|---|---|---|---|---|
| Diameter of | 1st | | 2nd | | 3rd | | 4th | | 5th | | 6th | |
| load: 7.2 mm | CLOSE | OPEN | CLOSE | OPEN | CLOSE | OPEN | CLOSE | OPEN | CLOSE | OPEN | CLOSE | OPEN | Reference |
| 0.38 | A | ↓ | A | ↓ | A | ↓ | A | ↓ | A | ↓ | A | ↓ | Rotating |
| 0.40 | A | ↓ | A | ↓ | A | ↓ | A | ↓ | A | ↓ | A | ↓ | Rotating |
| 0.42 | A | ↓ | A | ↓ | ↓ | — | A | ↓ | A | ↓ | A | ↓ | Rotating |
| 0.44 | A | ↓ | A | ↓ | A | ↓ | A | ↓ | A | ↓ | A | ↓ | Rotating |
| 0.46 | A | ↓ | A | ↓ | A | ↓ | A | ↓ | A | ↓ | A | ↓ | Rotating |
| 0.48 | A | ↓ | A | ↓ | A | ↓ | A | ↓ | A | ↓ | A | ↓ | Rotating |
| 0.50 | A | ↓ | A | ↓ | A | ↓ | A | ↓ | A | ↓ | A | ↓ | Rotating |

Experimental condition: The load was dropped from a position 30 mm above the mouth of the supporting cylinder, while the shutter was closed.
Symbol A: The load was caught by the arm side graphite, and was floated while rotating.
Symbol ↑: The load flew out over the arm.
Symbol ↓: The load dropped immediately to the bottom, or the load dropped when the shutter was opened.
Measuring instrument: a regulator gauge at minimum scale value of 0.02 MPa.
Supplied air: factory air in normal temperature.

Table 1 shows the behavior of the load under the condition that when the porous material at a the porosity ratio of 21% was used, the air supplying pressure was changed, the shutter member opened and closed the bottom of the supporting cylinder, and three trials under the same condition were achieved. The supplied supporting fluid was ambient air at room temperature, the load was dropped from a position about 30 mm above the mouth of the supporting cylinder, and the inventors checked whether the load would float and thus be supported. When the supplied air pressure was 0.12 MPa or less in the opened shutter condition, all the loads dropped, and the inventors realized that it was impossible to support the given load under a floating condition. Further, in this case, the inventor found that in the closed shutter condition, all the loads were supported under a floating condition. That is, when the supplied air pressure is 0.12 MPa or less, it is possible to support the load precisely with a closed shutter member under a floating condition, and when the shutter member is opened, it is possible to drop the load precisely, and making it possible to place the load at a predetermined position. Accordingly, it is possible to select the floating condition, or the dropping of the load by the mechanical operation of closing or opening of the shutter member. Still further, when the supplied air pressure is 0.14 MPa or greater, it is possible to float the load, no matter whether the shutter member is opened or closed, and further in this case, when the supplied air pressure is set to 0.12 MPa or less in the shutter member opened condition, it is possible to drop the load which has been supported under the floating condition. In the above-mentioned case, the mechanical operation is absolutely unnecessary, and mere pressure adjustment of the supplied fluid can change from the non-contact supporting condition to dropping of the load. As shown in the remarks column of Table 1, when the supplied air pressure is 0.02 MPa, the load under the floating condition is rotating while floating, and its surface is uniformly exposed to the fluid. When the supplied air pressure is between 0.04 and 0.08 MPa, the load vibrates, swings, or jiggles, and the surface of the load is randomly but more uniformly exposed to the fluid. When the supplied air pressure is equal to or greater than 0.10 MPa, the load jiggles violently. Therefore, it must be understood that the load, which is floated and supported by the conveyance device of the present invention, receives the flowing force on its whole surface very uniformly from the fluid, and due to this, when the load is floated and supported by the heated fluid, the entire surface of the load is uniformly heated. However, when the load is violently jiggling by air pressure greater than 0.10 MPa, the load may be blown out by the acceleration during the conveyance, and therefore, it is desirable to extend the height of the tapered wall section located on the top of the through hole, to double the average diameter of the load, based on the taper angle.

Table 2 shows the behavior of the load when a porous material at a porosity ratio of 16% was used, the air supplying pressure was changed, and the shutter member was opened or closed, identical to the case of Table 1. However, differing from the case of Table 1, the experiment under the same condition were repeated six times to specifically study the repeatability and reliability of the supporting function. By studying the experiment results, it was understood that when the fluid supplying pressure was 0.32 MPa or less, the load could sometimes not be supported in a floating condition, even though the shutter member had been closed, that is, the conveyance function was not sufficient. Further when the supplying pressure was 0.38 MPa, non-support occurred one time with the shutter member closed, which means that the reliability was not sufficient. In this case, if an additional 0.05 MPa is given as a safety margin, it is shown that the load can be supported in the floating condition by supplying a pressure of 0.44 MPa or greater, with the shutter member closed. Generally, since the practical upper limit of the pressure of the supplied fluid is approximately 0.5 MPa from the point of view of economical efficiency or flow consumption, the supplied pressure of 0.5 MPa is used for the maximum value in Table 2. In the pressure scope of 0.44 MPa –0.5 MPa, which was capable of supporting the load under the floating condition, when the shutter member was opened, all the loads dropped, and thereby, it was possible to control floating condition of the load or dropping of the load, by closing or opening the shutter member. Further, when the shutter member is open, all the loads drop and cannot be supported, and thereby, it is not possible to change by a change of fluid supplying pressure, between the floating condition of the load, or dropping of the load, without the mechanical operation such as the case shown in Table 1. According to the remarks column of Table 2, it can be learned that when the load is supported in the floating condition, the load rotates stably, and its surface is uniformly exposed to the fluid. Still further, the vibration or swing was not noted so that the load was stably conveyed without being blown out, even though the height of the tapered wall section of the supporting cylinder was shortened to the length of the average diameter of the load, and further, the height of the porous parts can be shortened. Therefore, the experimental results teach that a down-sized and weight-saving conveyance device can be produced.

Table 3 shows further experimental results, in which a similar experiment as Table 2 was performed by using porous material with a porosity ratio of 8%. When the air supplying pressure is less than 0.42 MPa, non-support of the load happens even with the shutter member closed. After allowing a safety margin of 0.05 MPa, when the air supplying pressure is 0.048 MPa or greater, the load can be supported stably under floating condition. However, since the highest allowed supplying pressure limit is 0.5 MPa as mentioned above, the pressure scope wherein the load can be stably supported in the floating condition, is not so wide as in the case of Table 2. Concerning the behavior of the load which is supported in the floating condition, the load rotated stably similarly to the case of Table 2, and the entire surface of the load was exposed to the fluid uniformly.

As mentioned above, according to the experimental results of Tables 1, 2 and 3, porous materials having porosity ratios of 21% and 16%, were satisfactory results. If the higher supplying pressure is used, the porous material of the porosity ratio of 8% can be used, but the stable pressure scope is narrower.

Table 4, 5, and 6 show the behavior of the load during floating support and dropping, under the condition wherein the maximum diameter of the load is 2.6 mm, the inside diameter of the through hole is 2.8 mm, and the three types of porous material with porosity ratios of 21%, 16%, and 8% were used as shown in FIG. 2. The apex angle of the tapered wall section of the supporting cylinder is 30 degrees, and the supplied fluid is ambient air at room temperature, which is the same as in the case of Tables 1–3.

TABLE 4

| Porosity ratio: 21% | | | Shutter member | | | | | | | | | | |
|---|---|---|---|---|---|---|---|---|---|---|---|---|---|
| Diameter of | 1st | | 2nd | | 3rd | | 4th | | 5th | | 6th | | |
| load: 2.6 mm | CLOSE | OPEN | CLOSE | OPEN | CLOSE | OPEN | CLOSE | OPEN | CLOSE | OPEN | CLOSE | OPEN | Reference |
| Pressure of supplied gas [MPa] 0 | — | — | — | — | — | — | — | — | — | — | — | — | |
| 0.02 | A | ↓ | A | ↓ | A | ↓ | ↑ | — | A | ↓ | A | ↓ | Rotating |
| 0.04 | ↑ | A | ↑ | A | ↑ | A | ↑ | A | ↑ | A | ↑ | A | Jiggling |
| 0.06 | ↑ | A | ↑ | ↑ | ↑ | A | ↑ | A | ↑ | A | ↑ | A | Jiggling |

Experimental condition: The load was dropped from a position 30 mm above the mouth of the supporting cylinder, while the shutter was closed.
Symbol A: The load was caught by the arm side graphite, and was floated while rotating.
Symbol ↑: The load was not supported and flew out over the arm.
Symbol ↓: The load dropped immediately to the bottom, or the load dropped when the shutter was opened.
Measuring instrument: a regulator gauge at minimum scale value of 0.02 MPa.
Supplied air: factory air in normal temperature.

TABLE 5

| Porosity ratio: 16% | | | Shutter member | | | | | | | | | | |
|---|---|---|---|---|---|---|---|---|---|---|---|---|---|
| Diameter of | 1st | | 2nd | | 3rd | | 4th | | 5th | | 6th | | |
| load: 2.6 mm | CLOSE | OPEN | CLOSE | OPEN | CLOSE | OPEN | CLOSE | OPEN | CLOSE | OPEN | CLOSE | OPEN | Reference |
| Pressure of supplied gas [MPa] 0 | — | — | — | — | — | — | — | — | — | — | — | — | |
| 0.08 | ↓ | — | ↓ | — | ↓ | — | ↓ | — | ↓ | — | ↓ | — | Not caught |
| 0.10 | ↓ | — | ↓ | — | ↓ | — | ↓ | — | ↓ | — | ↓ | — | Not caught |
| 0.12 | A | ↓ | ↓ | — | A | ↓ | A | ↓ | A | ↓ | A | ↓ | Rotating |
| 0.14 | A | ↓ | A | ↓ | A | ↓ | A | ↓ | A | ↓ | A | ↓ | Rotating |
| 0.16 | A | ↓ | A | ↓ | A | ↓ | A | ↓ | A | ↓ | A | ↓ | Rotating |
| 0.18 | A | ↓ | A | ↓ | A | ↓ | A | ↓ | A | ↓ | A | ↓ | Rotating |
| 0.20 | A | ↓ | A | ↓ | A | ↓ | A | ↓ | A | ↓ | A | ↓ | Rotating |
| 0.30 | A | ↓ | A | ↓ | A | ↓ | A | ↓ | A | ↓ | A | ↓ | Rotating |
| 0.40 | A | ↓ | A | ↓ | A | ↓ | A | ↓ | A | ↓ | A | ↓ | Jiggling |
| 0.50 | A | ↓ | A | ↓ | A | ↓ | A | ↓ | A | ↓ | A | ↓ | Jiggling |

Experimental condition: The load was dropped from a position 30 mm above the mouth of the supporting cylinder, while the shutter was closed.
Symbol A: The load was caught by the arm side graphite, and was floated while rotating.
Symbol ↑: The load was not supported and flew out over the arm.
Symbol ↓: The load dropped immediately to the bottom, or the load dropped when the shutter was opened.
Measuring instrument: a regulator gauge at minimum scale value of 0.02 MPa.
Supplied air: factory air in normal temperature.

TABLE 6

| Porosity ratio: 8% Diameter of load: 2.6 mm | | Shutter member | | | | | | | | | | | | |
|---|---|---|---|---|---|---|---|---|---|---|---|---|---|---|
| | | 1st | | 2nd | | 3rd | | 4th | | 5th | | 6th | | |
| | | CLOSE | OPEN | CLOSE | OPEN | CLOSE | OPEN | CLOSE | OPEN | CLOSE | OPEN | CLOSE | OPEN | Reference |
| Pressure of supplied gas [MPa] | 0 | — | — | — | — | — | — | — | — | — | — | — | — | |
| | 0.10 | ↓ | — | ↓ | — | ↓ | — | ↓ | — | ↓ | — | ↓ | — | Not caught |
| | 0.12 | ↓ | — | ↓ | — | ↓ | — | ↓ | — | ↓ | — | ↓ | — | Not caught |
| | 0.14 | A | ↓ | A | ↓ | A | ↓ | ↓ | — | A | ↓ | A | ↓ | Rotating |
| | 0.16 | A | ↓ | A | ↓ | A | ↓ | A | ↓ | A | ↓ | A | ↓ | Rotating |
| | 0.18 | A | ↓ | A | ↓ | ↓ | — | A | ↓ | A | ↓ | A | ↓ | Rotating |
| | 0.20 | A | ↓ | A | ↓ | A | ↓ | A | ↓ | A | ↓ | A | ↓ | Rotating |
| | 0.22 | A | ↓ | A | ↓ | A | ↓ | A | ↓ | A | ↓ | A | ↓ | Rotating |
| | 0.24 | A | ↓ | A | ↓ | A | ↓ | A | ↓ | A | ↓ | A | ↓ | Rotating |
| | 0.26 | A | ↓ | A | ↓ | A | ↓ | A | ↓ | A | ↓ | A | ↓ | Rotating |
| | 0.28 | A | ↓ | A | ↓ | A | ↓ | A | ↓ | A | ↓ | A | ↓ | Rotating |
| | 0.30 | A | ↓ | A | ↓ | A | ↓ | A | ↓ | A | ↓ | A | ↓ | Rotating |
| | 0.40 | A | ↓ | A | ↓ | A | ↓ | A | ↓ | A | ↓ | A | ↓ | Rotating |
| | 0.46 | A | ↓ | A | ↓ | A | ↓ | A | ↓ | A | ↓ | A | ↓ | Rotating |
| | 0.48 | A | ↓ | A | ↓ | A | ↓ | A | ↓ | A | ↓ | A | ↓ | Rotating |
| | 0.50 | A | ↓ | ↑ | ↓ | A | ↓ | A | ↓ | ↑ | ↓ | ↑ | ↓ | Rotating |

Experimental condition: The load was dropped from a position 30 mm above the mouth of the supporting cylinder, while the shutter was closed.
Symbol A: The load was caught by the arm side graphite, and was floated while rotating.
Symbol ↑: The load was not supported and flew out over the arm.
Symbol ↓: The load dropped immediately to the bottom, or the load dropped when the shutter was opened.
Measuring instrument: a regulator gauge at minimum scale value of 0.02 MPa.
Supplied air: factory air in normal temperature.

Table 4 shows results, when porous material with the porosity ratio of 21% was used. When the supplying air pressure was 0.02 MPa or less with the shutter member closed, non-support of the load occurred, and there was little reliability. When the supplied air pressure was 0.04 MPa or greater with the shutter member closed, all loads were blown out and they were not supported in the floating condition. When the supplied air pressure was 0.06 MPa with the shutter member opened, the loads floated, but non-support occurred, which translates that the loads were not stably supported. That is, when the diameter of the load is 2.6 mm and the porosity ratio of the porous material is 21%, it is understood that floating support and dropping of the load were not stably performed, not only by the method of the mechanical closing and opening of the shutter member, but also by the method of changing of the pressure of the supplied air.

Table 5 shows the results when the porous material of a porosity ratio of 16% was used. When the supplied air pressure was 0.12 MPa or less, and even in the shutter member closed condition, non-support occurred, and the floating support of the load was less than acceptable. However, the floating support was performed perfectly in the extremely wide range of 0.14 MPa–0.5 MPa. When the shutter member was open in this pressure range, all the loads dropped, and the dropping was consistent. Giving a good safety margin of 0.05 MPa to 0.12 MPa, that is, in the range of 0.18 MPa or greater, it was understood that the reliable and consistent floating support of the load was achieved. As shown in the remarks column, up to 0.30 MPa, the load supported in the floating condition rotates slowly, and its surface was exposed to the fluid uniformly. Therefore, it is possible to perform dimension and weight down-sizing of the conveyance device, by shortening the height of the tapered wall section of the supporting cylinder to a value of the average diameter of the load.

Table 6 shows results when porous material at a porosity ratio of 8% was used in an experiment similar to Table 5. Non-support of the load with the shutter member closed, occurred at up to 0.18 MPa of supplied pressure. Therefore, given a safety margin of 0.05 MPa, it is possible to consider that the load can be stably supported in the floating condition in the range of the air pressure of 0.24 MPa or greater. However, the load was blown out under the shutter closed condition by air pressure of 0.5 MPa. By allowing a margin of 0.05 MPa at the lower pressure, it is possible to think that the load can be stably supported in the floating condition, in the range up to 0.45 MPa. It is understood that in the extremely wide range greater than 0.2 MPa, the load is supported in the floating condition or the load drops by the closing or opening of the shutter member. The load supported in the floating condition rotates slowly, and its surface is uniformly exposed to the fluid. Therefore, by shortening the height of the tapered wall section of the supporting cylinder to be the value of the average diameter of the load, it is possible to perform the dimension and weight downsizing of the conveyance device.

As mentioned above, Tables 4, 5, and 6 show that it is possible to obtain the operation to stably support the load in the floating condition or the operation to stably drop the load, whichever the material was used, between the materials of porosity ratios of 16% or 8%. Besides, the changeover of the operation can be performed by only the mechanical method of closing or opening the shutter member.

Tables 7, 8, and 9 show behavior of the load during the floating support and the dropping, under the condition when the maximum diameter of the load is 1.2 mm, and the inside diameter of the through hole formed by the porous material is 1.4 mm, as shown in FIG. 3. The apex angle of the tapered wall section of the supporting cylinder is 30 degrees, and the supplied fluid is ambient air in normal temperature.

TABLE 7

| Porosity ratio: 21% | | Shutter member | | | | | | | | | | | |
|---|---|---|---|---|---|---|---|---|---|---|---|---|---|
| Diameter of | | 1st | | 2nd | | 3rd | | 4th | | 5th | | 6th | |
| load: 1.2 mm | | CLOSE | OPEN | CLOSE | OPEN | CLOSE | OPEN | CLOSE | OPEN | CLOSE | OPEN | CLOSE | OPEN | Reference |
| Pressure | 0 | — | — | — | — | — | — | — | — | — | — | — | — | |
| of | 0.03 | ↑ | A | ↑ | A | ↑ | A | — | — | — | — | — | — | *1 |
| supplied | 0.05 | ↑ | ↑ | ↑ | ↑ | ↑ | ↑ | — | — | — | — | — | — | *2 |
| gas [MPa] | | | | | | | | | | | | | | |

*1: These are reference values, because the measured values are in less than the smallest division of the pressure gauge.
*2: This condition cannot be used, and the conditions following this condition are omitted.
Experimental condition: The load was dropped from a position 30 mm above the mouth of the supporting cylinder, while the shutter was closed.
Symbol A: The load was caught by the arm side graphite, and was floated while rotating.
Symbol ↑: The load was not supported and flew out over the arm.
Symbol ↓: The load dropped immediately to the bottom, or the load dropped when the shutter was opened.
Measuring instrument: a regulator gauge at minimum scale value of 0.02 MPa.
Supplied air: factory air in normal temperature.

TABLE 8

| Porosity ratio: 16% | | Shutter member | | | | | | | | | | | |
|---|---|---|---|---|---|---|---|---|---|---|---|---|---|
| Diameter of | | 1st | | 2nd | | 3rd | | 4th | | 5th | | 6th | |
| load: 1.2 mm | | CLOSE | OPEN | CLOSE | OPEN | CLOSE | OPEN | CLOSE | OPEN | CLOSE | OPEN | CLOSE | OPEN | Reference |
| Pressure | 0 | — | — | — | — | — | — | — | — | — | — | — | — | |
| of | 0.05 | A | ↓ | A | ↓ | A | ↓ | — | — | — | — | — | — | Rotating? |
| supplied | 0.10 | A | ↓ | A | ↓ | A | ↓ | — | — | — | — | — | — | Rotating |
| gas | 0.15 | A | ↓ | A | ↓ | A | ↓ | — | — | — | — | — | — | Jiggling |
| [MPa] | 0.20 | ↑ | ↓ | ↑ | ↓ | ↑ | ↓ | — | — | — | — | — | — | Jiggling |
| | 0.25 | ↑ | A | ↑ | A | ↑ | A | — | — | — | — | — | — | Jiggling |
| | 0.30 | ↑ | A | ↑ | A | ↑ | A | — | — | — | — | — | — | Jiggling |
| | 0.35 | ↑ | A | ↑ | A | ↑ | A | — | — | — | — | — | — | Jiggling |
| | 0.40 | ↑ | A | ↑ | A | ↑ | A | — | — | — | — | — | — | Jiggling |
| | 0.45 | ↑ | A | ↑ | A | ↑ | A | — | — | — | — | — | — | Jiggling |
| | 0.50 | ↑ | A | ↑ | A | ↑ | A | — | — | — | — | — | — | Jiggling |

Experimental condition: The load was dropped from a position 30 mm above the mouth of the supporting cylinder, while the shutter was closed.
Symbol A: The load was caught by the arm side graphite, and was floated while rotating.
Symbol ↑: The load was not supported and flew out over the arm.
Symbol ↓: The load dropped immediately to the bottom, or the load dropped when the shutter was opened.
Measuring instrument: a regulator gauge at minimum scale value of 0.02 MPa.
Supplied air: factory air in normal temperature.

TABLE 9

| Porosity ratio: 8% | | Shutter member | | | | | | | | | | | |
|---|---|---|---|---|---|---|---|---|---|---|---|---|---|
| Diameter of | | 1st | | 2nd | | 3rd | | 4th | | 5th | | 6th | |
| load: 1.2 mm | | CLOSE | OPEN | CLOSE | OPEN | CLOSE | OPEN | CLOSE | OPEN | CLOSE | OPEN | CLOSE | OPEN | reference |
| Pressure | 0 | — | — | — | — | — | — | — | — | — | — | — | — | |
| of | 0.06 | ↓ | — | ↓ | — | ↓ | — | ↓ | — | ↓ | — | ↓ | — | Not caught |
| supplied | 0.08 | A | ↓ | A | ↓ | A | ↓ | A | ↓ | ↓ | — | A | ↓ | Rotating |
| gas | 0.10 | A | ↓ | A | ↓ | A | ↓ | A | ↓ | A | ↓ | A | ↓ | Rotating |
| [Mpa] | 0.12 | A | ↓ | A | ↓ | A | ↓ | A | ↓ | A | ↓ | A | ↓ | Rotating |
| | 0.14 | A | ↓ | A | ↓ | A | ↓ | A | ↓ | A | ↓ | A | ↓ | Rotating |
| | 0.20 | A | ↓ | A | ↓ | A | ↓ | A | ↓ | A | ↓ | A | ↓ | Rotating |
| | 0.22 | A | ↓ | A | ↓ | ↑ | ↓ | A | ↓ | A | ↓ | ↑ | ↓ | Rotating |
| | 0.24 | A | ↓ | A | ↓ | A | ↓ | ↑ | ↓ | A | ↓ | A | ↓ | Jiggling |
| | 0.26 | A | ↓ | ↑ | ↓ | A | ↓ | ↑ | ↓ | ↑ | ↓ | A | ↓ | Jiggling |

TABLE 9-continued

| Porosity ratio: 8% | Shutter member | | | | | | | | | | | |
|---|---|---|---|---|---|---|---|---|---|---|---|---|
| Diameter of | 1st | | 2nd | | 3rd | | 4th | | 5th | | 6th | |
| load: 1.2 mm | CLOSE | OPEN | CLOSE | OPEN | CLOSE | OPEN | CLOSE | OPEN | CLOSE | OPEN | CLOSE | OPEN | reference |
| 0.28 | ↑ | ↓ | ↑ | ↓ | A | ↓ | ↑ | ↓ | ↑ | ↓ | A | ↓ | Jiggling |
| 0.30 | ↑ | A | A | A | ↑ | A | ↑ | A | ↑ | A | ↑ | ↓ | Jiggling violently |

Experimental condition: The load was dropped from a position 30 mm above the mouth of the supporting cylinder, while the shutter was closed.
Symbol A: The load was caught by the arm side graphite, and was floated while rotating.
Symbol ↑: The load was not supported and flew out over the arm.
Symbol ↓: The load dropped immediately to the bottom, or the load dropped when the shutter was opened.
Measuring instrument: a regulator gauge at minimum scale value of 0.02 MPa.
Supplied air: factory air in normal temperature.

Table 7 shows the behavior of the load under the condition when a porous material with a porosity ratio of 21% was used, the air supplying pressure was changed, the shutter member was opened or closed, and three trials under the same condition were achieved. It was understood that when the air supplying pressure was 0.03 MPa in the shutter opened condition, the load was supported in the floating condition, but when the air supplying pressure was 0.05 MPa, the load was blown out and not supported. That proves that the load can only be stably supported in the floating condition in a very narrow scope of pressure.

Table 8 shows the behavior of the load under the condition when porous material at porosity ratio of 16% was used. Up to air supplying pressure of 0.15 MPa, the given load can be supported in the floating condition with the shutter closed, and when the shutter member is opened, the load drops. When the air supplying pressure is 0.25 MPa or greater, being beyond the unstable range of 0.20 MPa, the load is blown out in the shutter member closed condition, but when the shutter member is open, the load can be stably supported in the floating condition. That is, when the air supplying pressure is 0.15 MPa or less, it is possible to support the load in the floating condition or to make the load drop by a mere mechanical closing or opening operation of the shutter member. It is understood that when the supplying pressure is 0.25 MPa or greater, while the shutter open, the given load can be supported in the floating condition or the load can be dropped, by changing the pressure of the supplied air. Further, when the pressure is 0.15 MPa or greater, the load vibrates or swings, therefore, in order to prevent the load from being blown out during conveyance, it is necessary to extend the height of the tapered wall section of the supporting cylinder to be double the average diameter of the given load in accordance with the taper angle.

Table 9 shows floating behavior of the given load when the porous material with a porosity ratio of 8% was used, of which six trials under the same condition were conducted. When the supplied air pressure was between 0.10–0.20 MPa, it was possible to support the load in the floating condition with the shutter member closed, and it was also possible to drop the load, when the shutter member was opened. Reliability was achieved by giving a margin of 0.05 MPa to both the lower limit and the upper limit of the supplied air pressure range, a pressure of only 0.15 MPa was required by which the given load could be supported in a stable floating condition and the load could be dropped. Further, in the pressure range of 0.22–0.5 MPa, non-load support always occurred, proving to be an extremely unstable condition.

As mentioned above in Tables 7, 8, and 9, when porous material at a porosity ratio of 16% is used, the load can most stably be supported in the floating condition. Further, it is possible to rely on stable supporting operation of the load in the floating condition, or dropping operation of the load and placing the load at a predetermined position, whether method was used, the method of mechanical closing or opening of the shutter member, or the method of changing of the supplied air pressure.

Figure 9:
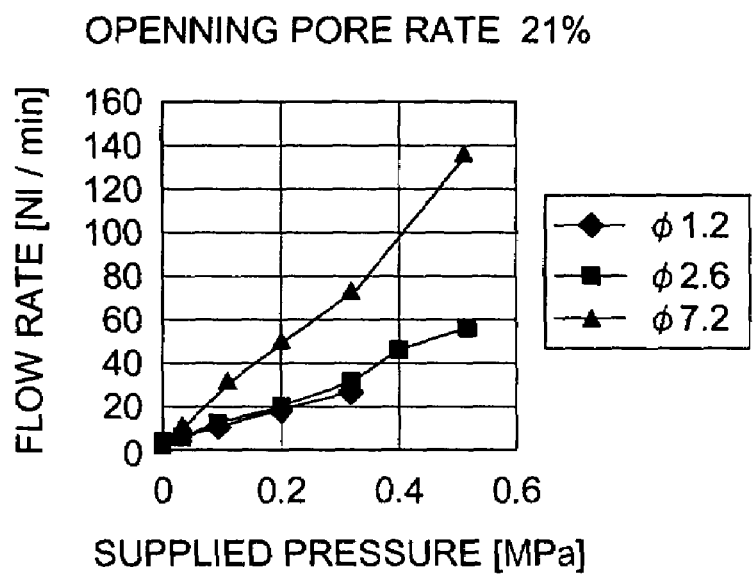
FIG. 9 shows experimental results of the inventors.
Figure 10:
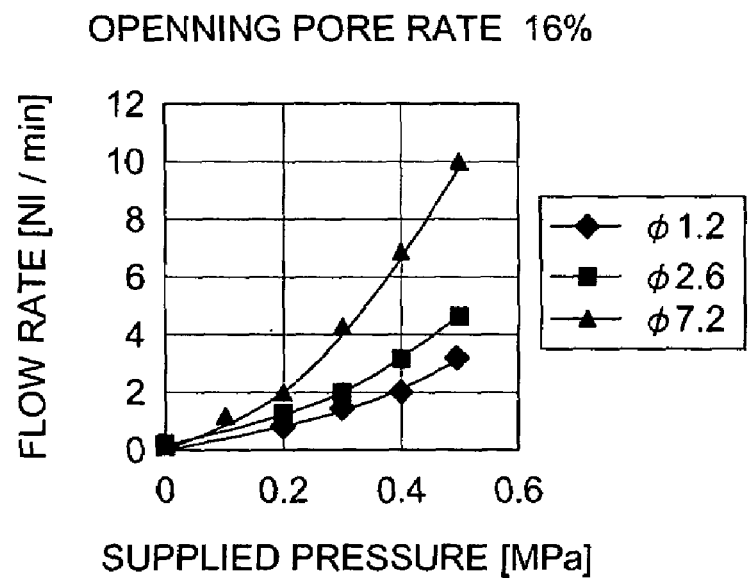
FIG. 10 shows experimental results of the inventors.
Figure 11:
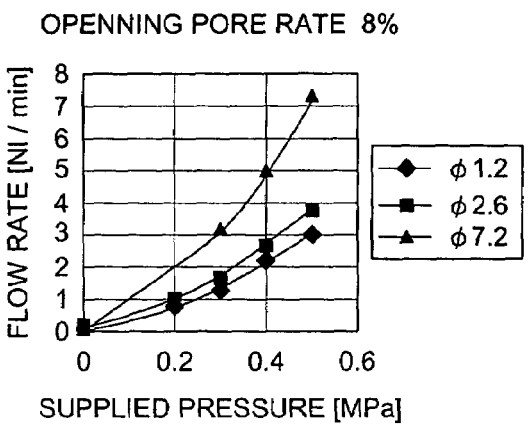
FIG. 11 shows experimental results of the inventors.
Figure 12:
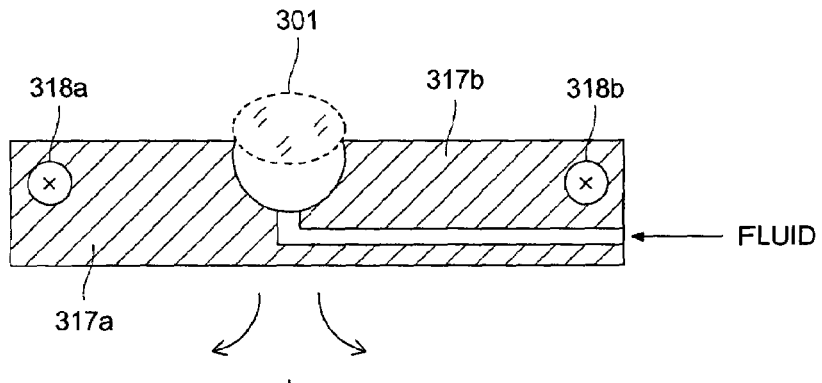
FIGS. 12(*a*) and 12(*b*) each shows the structure of conventional technology.
Figure 12:
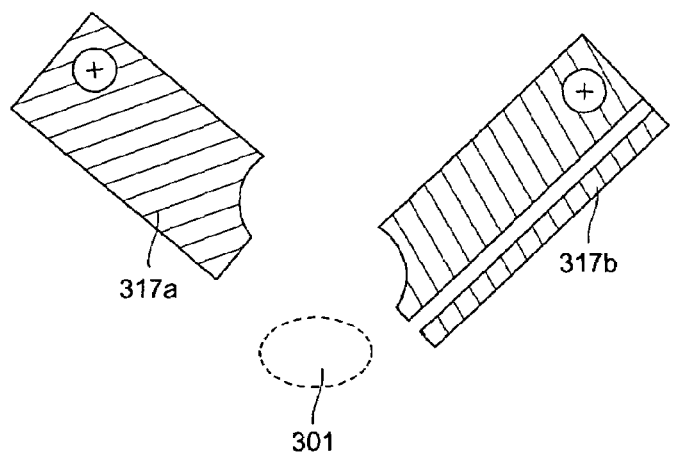
Figure 13:
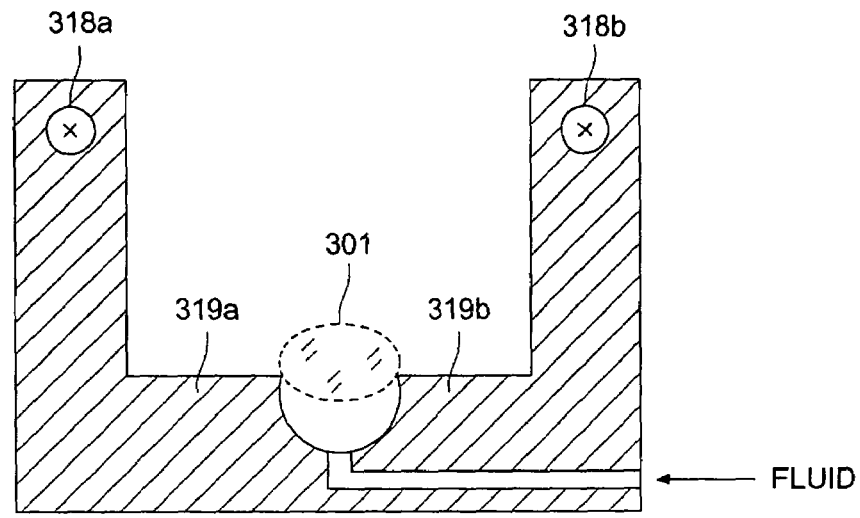
FIGS. 13(*a*) and 13(*b*) each shows the structure of conventional technology.
Figure 13:
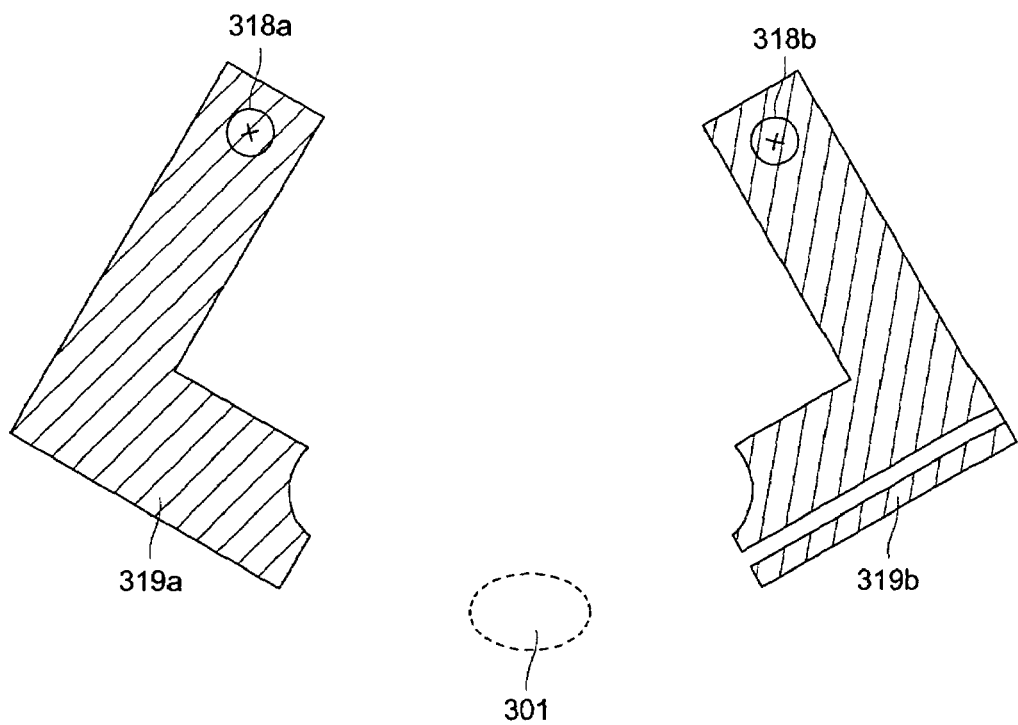

In Table 10 and FIGS. 9, 10, and 11, concerning each of the porous materials at porosity ratios of 21%, 16%, and 8%, the relationship between the supplied air pressure in normal temperature and the amount of air jetting from the small pores of the porous material, is shown by the numerical values and the graphs, which are used for the experiments shown in Tables 1–9. In case of porous material at a porosity ratio of 21%, the amount of air for the required flow is extremely large, therefore economical pressure is 0.2 MPa or less, when a large number of conveyance devices are arranged or expensive fluid is used instead of air. Especially when a plurality of conveyance devices are arranged vertically or horizontally to deliver the given load, the total volume of the fluid used is several times greater than that of a single conveyance device, and thereby, it is better to support the load efficiently and stably, by making the flow volume of the fluid as small as possible. In that respect, concerning porosity ratios of 16% and 8%, flow volume of 10 Nl/min or less is the greatest acceptable volume of flow, in the conveyance system for delivering the load by a plurality of conveyance devices, from the point of view of the economy. Further, concerning porosity ratios of 16% and 8%, though there is double difference between their total pore areas, it is understood that the actual difference of the flow volume between them is only about 1.25 times. Accordingly, when the porosity ratio is 20% or less, the flow volume of the fluid decreases suddenly, and after that, even though the porosity ratio becomes smaller, the flow volume does not change greatly. That is, it can be said that the scope of the porosity ratio wherein the smallest volume of flow can efficiently support the given load, is 20% or less, and greater than 3% which includes half the value of 8% of the above described experiment.

TABLE 10

| | | Porosity ratio: 21% | | | Porosity ratio: 16% | | | Porosity ratio: 8% | | |
|---|---|---|---|---|---|---|---|---|---|---|
| | | Diameter 1.2 mm | Diameter 2.6 mm | Diameter 7.2 mm | Diameter 1.2 mm | Diameter 2.6 mm | Diameter 7.2 mm | Diameter 1.2 mm | Diameter 2.6 mm | Diameter 7.2 mm |
| | | Flowing time [min/45 l] | | | | | | | | |
| Supplying pressure [MPa] | 0 | 0 | 0 | 0 | 0 | 0 | 0 | 0 | 0 | 0 |
| | 0.05 | 7.00 | 7.00 | 3.00 | | | | | | |
| | 0.10 | 4.17 | 4.00 | 1.58 | | | 53.00 | | | |
| | 0.20 | 2.42 | 2.17 | 0.92 | 62.00 | 42.00 | 19.67 | | 52.00 | |
| | 0.30 | 1.67 | 1.50 | 0.63 | 34.00 | 24.00 | 10.50 | 33.00 | 28.00 | 14.00 |
| | 0.40 | 1.25 | 1.00 | | 21.00 | 14.75 | 6.67 | 20.50 | 17.50 | 9.00 |
| | 0.50 | 1.00 | 0.83 | 0.33 | 14.75 | 10.00 | 4.50 | 14.75 | 12.17 | 6.00 |
| | | Amount of flow [Nl/min] | | | | | | | | |
| Supplying pressure [MPa] | 0 | 0 | 0 | 0 | 0 | 0 | 0 | 0 | 0 | 0 |
| | 0.05 | 6.4 | 6.4 | 15.0 | | | | | | |
| | 0.10 | 10.8 | 11.3 | 28.4 | | | 0.8 | | | |
| | 0.20 | 18.6 | 20.8 | 49.1 | 0.7 | 1.1 | 2.3 | | 0.9 | |
| | 0.30 | 27.0 | 30.0 | 71.1 | 1.3 | 1.9 | 4.3 | 1.4 | 1.6 | 3.2 |
| | 0.40 | | 45.0 | | 2.1 | 3.1 | 6.8 | 2.2 | 2.6 | 5.0 |
| | 0.50 | | 54.0 | 135.0 | 3.1 | 4.5 | 10.0 | 3.1 | 3.7 | 7.5 |

As mentioned above, the present invention has been explained referring to the embodiment, but the invention should not be interpreted to be limited to the above-mentioned embodiments, and needless to say, it is possible to appropriately modify and to improve the embodiment.

As mentioned above, the present invention can provide a conveyance device, a conveyance system and a conveyance method which can convey a heated and melted load without touching it.

What is claimed is:

1. A conveyance device for conveying a load, comprising:
a load supporting device having a through hole with a top opening, a bottom opening, and an inner circumferential plane, the through hole passing in a gravity direction and allowing the load to move through the top opening and the bottom opening of the through hole without changing a size of the through hole; and
a fluid supplying device for supplying a fluid into the through hole through the inner circumferential plane to float the load in a first position within the through hole and for varying a net force in the gravity direction to move the load from the first position through the bottom opening of the through hole,
wherein a porous material is provided at least at a portion of the inner circumferential plane of the through hole.

2. The conveyance device of claim 1, wherein a top section of the through hole has a tapered wall section whose inside diameter increases toward a top open end.

3. The conveyance device of claim 2, wherein a taper angle of the tapered wall section is greater than 0 degree and less than 90 degrees.

4. The conveyance device of claim 2, wherein a height of the tapered wall section is greater than 0.2 times and less than 2.0 times a height of the load.

5. The conveyance device of claim 2, wherein a tapered end section having a taper angle greater than that of the tapered wall section is formed on the top open end of the tapered wall section.

6. The conveyance device of claim 1, wherein a porosity ratio of the porous material is 1% or more and 30% or less.

7. The conveyance device of claim 1, wherein the porous material is graphite.

8. The conveyance device of claim 1, further comprising:
a shutter member positioned lower than the fluid supplying device and movable between a position for closing at least a portion of the through hole and a position for opening the through hole.

9. The conveyance device of claim 1, wherein a pressure and/or an amount of the fluid supplied are changeable.

10. The conveyance device of claim 1, further comprising:
a heating device for raising a temperature of the fluid to be higher than a room temperature.

11. The conveyance device of claim 1, wherein the load is conveyed in a heated and fused condition.

12. The conveyance device of claim 1, wherein a deviation from a spherical form of the load is half or less than an average radius R of the load.

13. The conveyance device of claim 1, wherein the fluid is a gas of a nitrogen concentration at 60 mol % or more.

14. A conveyance method, comprising:
dropping a load from a top end of a through hole, the through hole passing through a load supporting device in a gravity direction;
supporting the load by supplying a fluid into the through hole;
stopping support of the load by changing a flowing condition of the fluid without changing a size of the through hole; and
allowing the load to break away from a bottom end of the through hole.

15. The conveyance method of claim 14, wherein the flowing condition of the fluid is varied by changing a pressure and/or an amount of the fluid.

16. The conveyance method of claim 14, wherein the flowing condition of the fluid is varied by closing at least a portion of the through hole.

17. The conveyance method of claim 14, further comprising:
heating the fluid.

18. The conveyance method of claim 14, wherein the load is conveyed while the load is heated and fused.

19. The conveyance method of claim 14, wherein a deviation from a spherical form of the load is half or less than an average radius R of the load.

20. The conveyance method of claim 14, wherein the load is glass.

21. The conveyance method of claim 14, wherein the load is plastic.

22. The conveyance method of claim 14, wherein the fluid is a gas of a nitrogen concentration at 60 mol % or more.

23. The conveyance method of claim 14, wherein the flowing condition of fluid is varied by opening and closing a shutter member when the fluid is supplied into the through hole.

24. A conveyance device for conveying a load, comprising:
   a load supporting device having a through hole with a top opening and a bottom opening, the through hole passing in a gravity direction and allowing the load to move through the top opening the bottom opening of the through hole;
   a fluid supplying device for supplying a fluid into the through hole to float the load in a first position within the through hole and for moving the load from the first position through the bottom opening of the through hole; and
   a shutter member positioned lower than the fluid supplying device and movable between a first position for closing at least a portion of the through hole and a second position for opening the through hole;
   wherein when the shutter member is in the first position and the fluid is being supplied to the through hole, the load conveying device can float the load within the through hole, and when the shutter member is in the second position, the load conveying device can move the load through the bottom opening to an outside portion without moving the through hole.

25. The load conveyance device of claim 24, wherein a top section of the through hole has a tapered wall section whose inside diameter increases toward a top open end.

26. The load conveyance device of claim 25, wherein a taper angle of the tapered wall section is greater than 0 degree and less than 90 degrees.

27. The load conveyance device of claim 25, wherein a height of the tapered wall section is greater than 0.2 times and less than 2.0 times a height of the load.

28. The load conveyance device of claim 25, wherein a tapered end section having a taper angle greater than that of the tapered wall section is formed on the top open end of the tapered wall section.

29. The load conveyance device of claim 24, wherein the fluid supplying device supplies the fluid through an inner circumferential plane of the through hole.

30. The load conveyance device of claim 24, wherein a pressure and/or an amount of fluid supplied are changeable.

31. The load conveyance device of claim 24, further comprising:
   a heating device for raising a temperature of the fluid to be higher than a room temperature.

32. The load conveyance device of claim 24, wherein the load is conveyed in a heated and fused condition.

33. The load conveyance device of claim 24, wherein a deviation from a spherical form of the load is half or less than an average radius R of the load.

34. The load conveyance device of claim 24, wherein the fluid is a gas of a nitrogen concentration at 60 mol % or more.

35. A conveyance method, comprising:
   dropping a load from a top end of a through hole, the through hole passing through a load supporting device in a gravity direction;
   supporting the load by supplying a fluid into the through hole, wherein a shutter member closes at least a portion of a bottom portion of the through hole;
   stopping support of the load by opening the shutter member without moving the through hole; and
   allowing the load to break away from a bottom end of the through hole.

36. The conveyance method of claim 35, further comprising:
   heating the fluid.

37. The conveyance method of claim 35, wherein the load is conveyed while the load is heated and fused.

38. The conveyance method of claim 35, wherein a deviation from a spherical form of the load is half of less than an average radius R of the load.

39. The conveyance method of claim 35, wherein the load is glass.

40. The conveyance method of claim 35, wherein the fluid is a gas of a nitrogen concentration at 60 mol % or more.

* * * * *